Aug. 12, 1941.   I. J. SNADER   2,251,961
MACHINE TOOL
Filed Dec. 2, 1937   17 Sheets-Sheet 3

INVENTOR
Ira J. Snader
By Parker, Carlson, Pitzner & Hubbard
ATTORNEYS

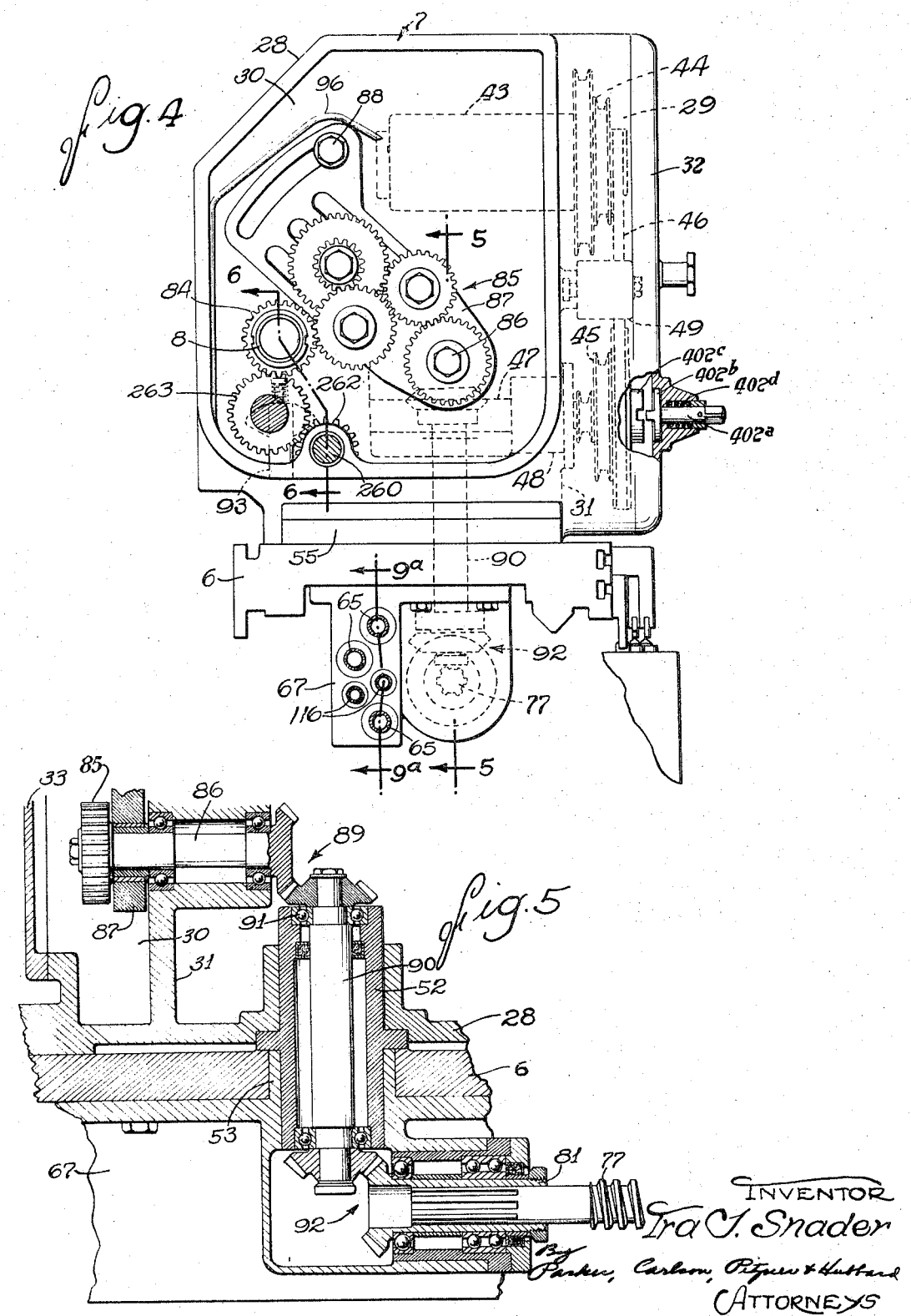

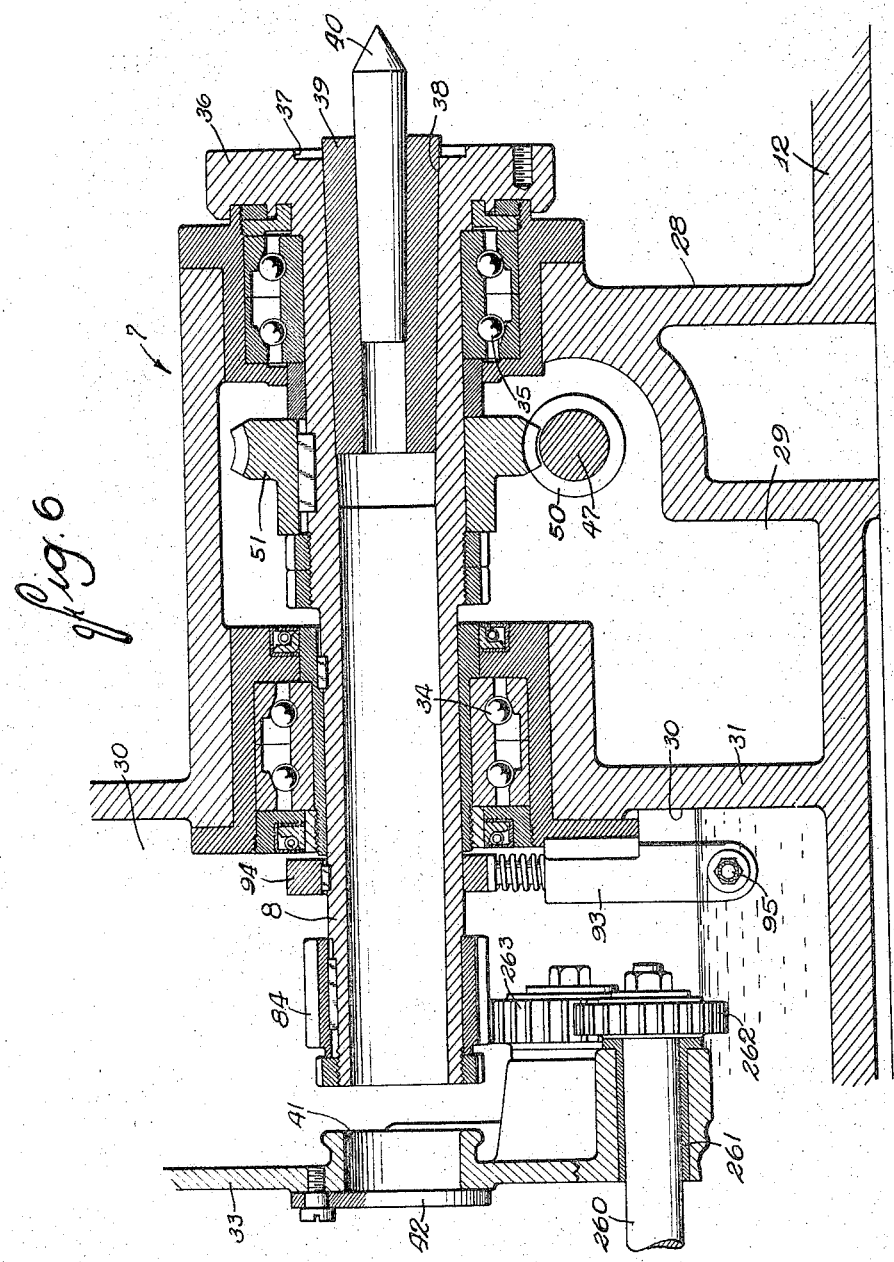

Aug. 12, 1941.　　　I. J. SNADER　　　2,251,961
MACHINE TOOL
Filed Dec. 2, 1937　　　17 Sheets-Sheet 6
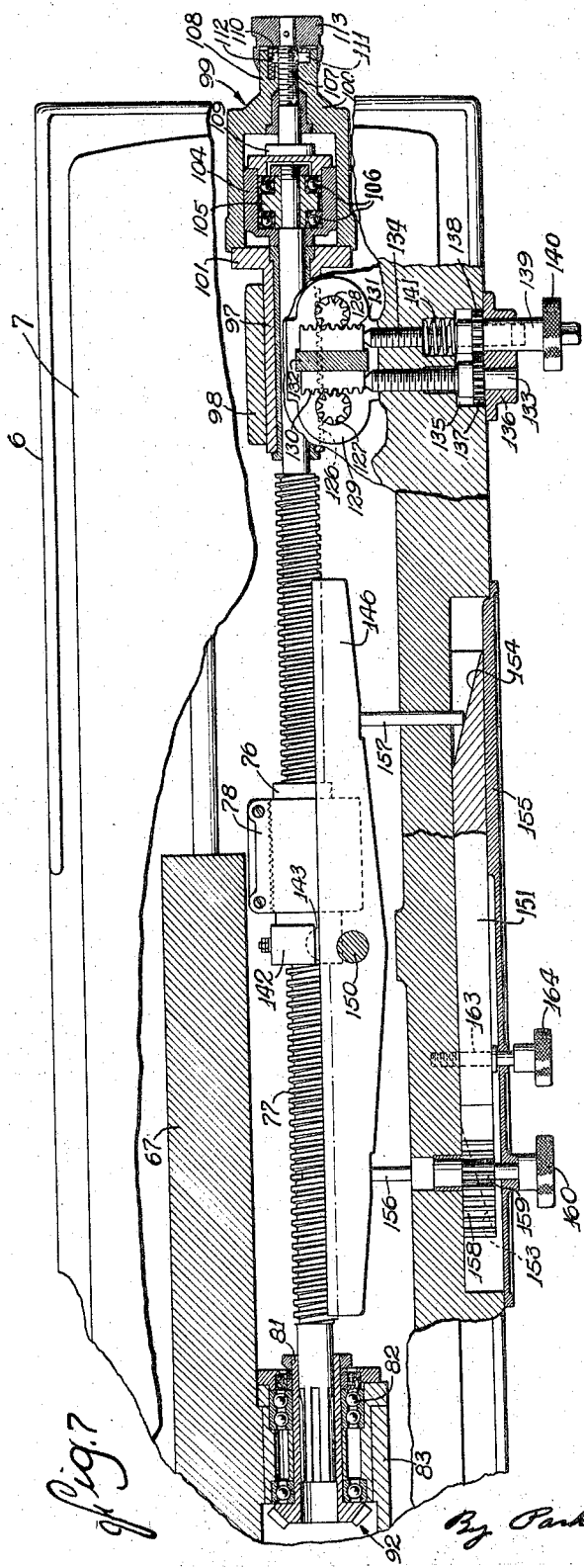
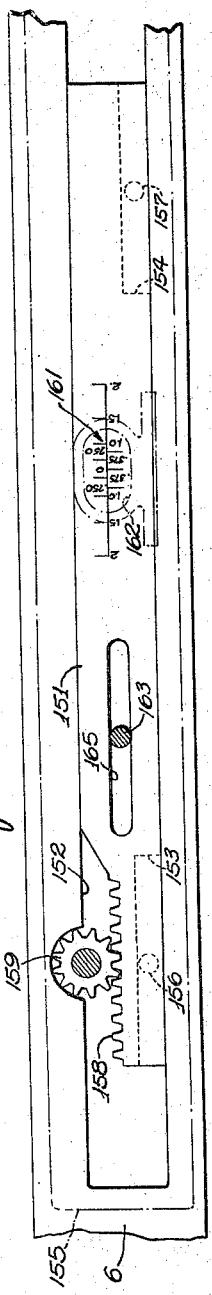
INVENTOR
Ira J. Snader
By Parker, Carlson, Pitzner & Hubbard
ATTORNEYS Aug. 12, 1941.   I. J. SNADER   2,251,961
MACHINE TOOL
Filed Dec. 2, 1937   17 Sheets-Sheet 7
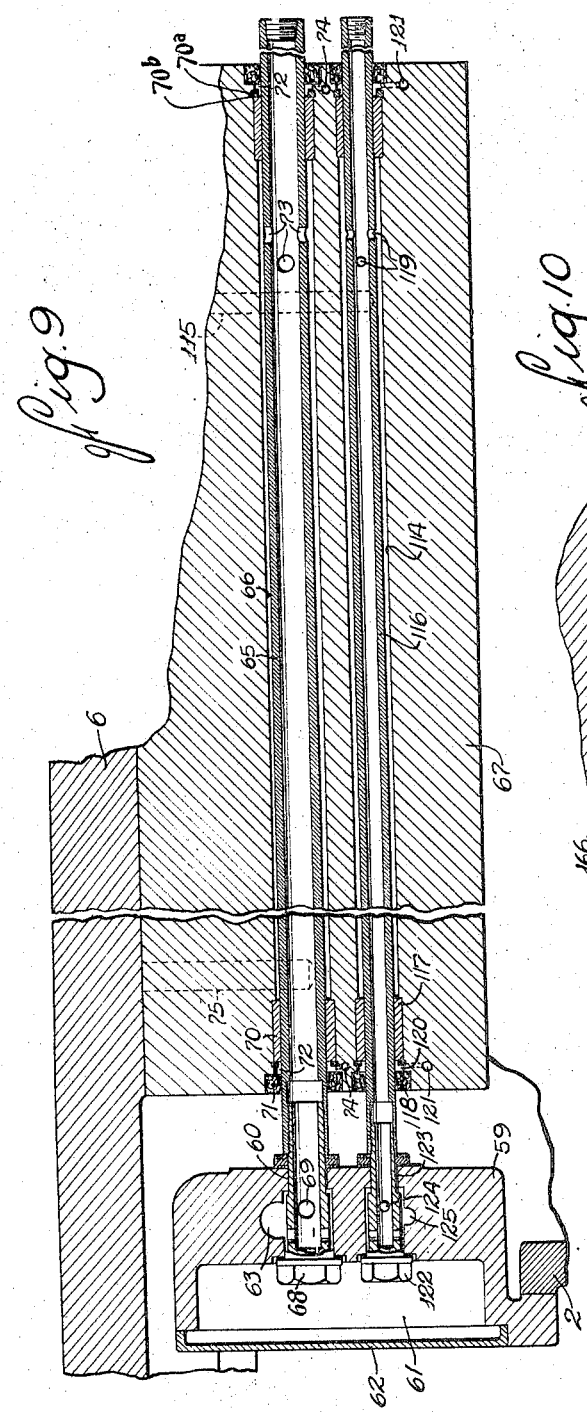
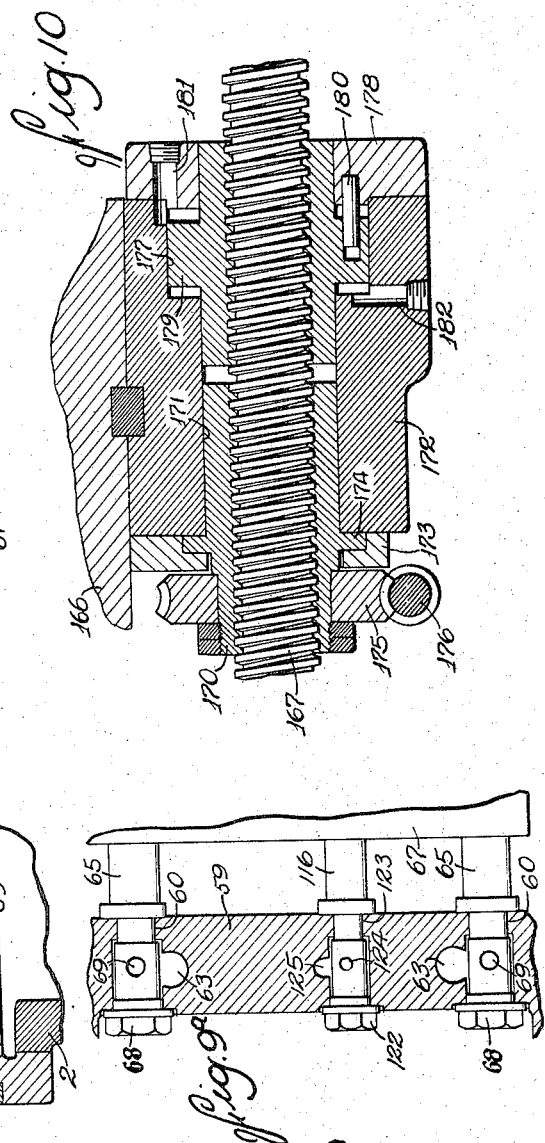
INVENTOR
Ira J. Snader
By Parker, Carlson, Pitzner & Hubbard
ATTORNEYS Aug. 12, 1941.  I. J. SNADER  2,251,961
MACHINE TOOL
Filed Dec. 2, 1937  17 Sheets-Sheet 8
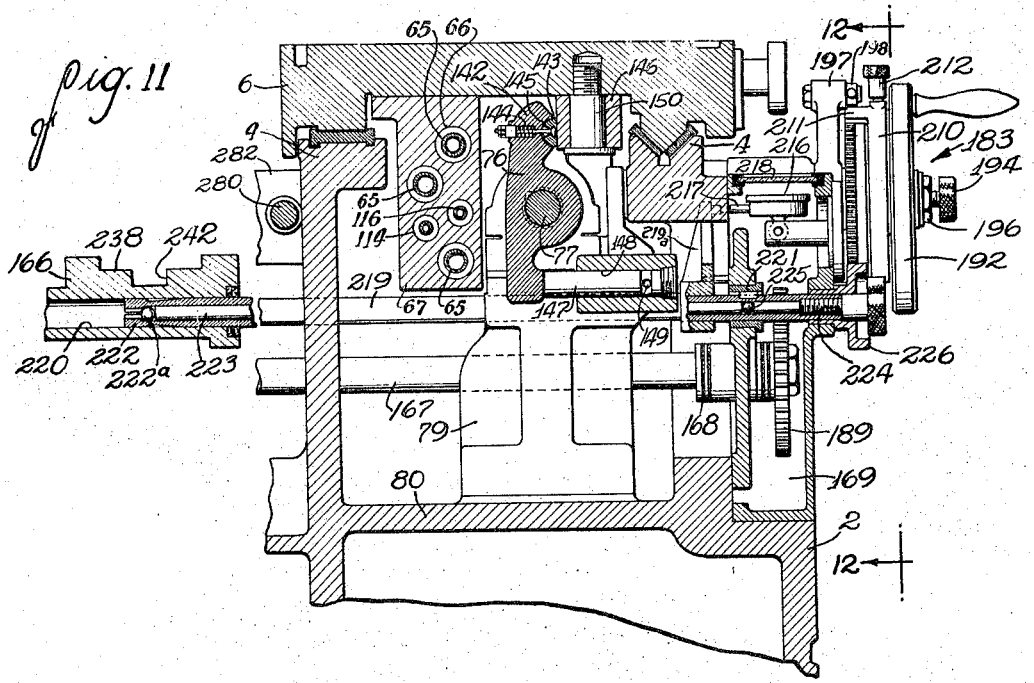
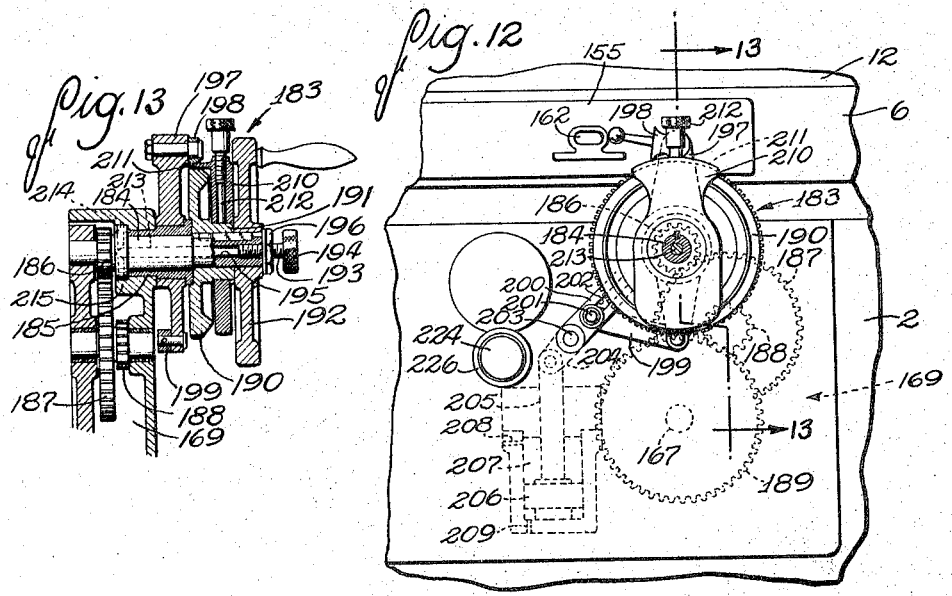
INVENTOR
Ira J. Snader
By Parker, Carlson, Pitzner & Hubbard
ATTORNEYS

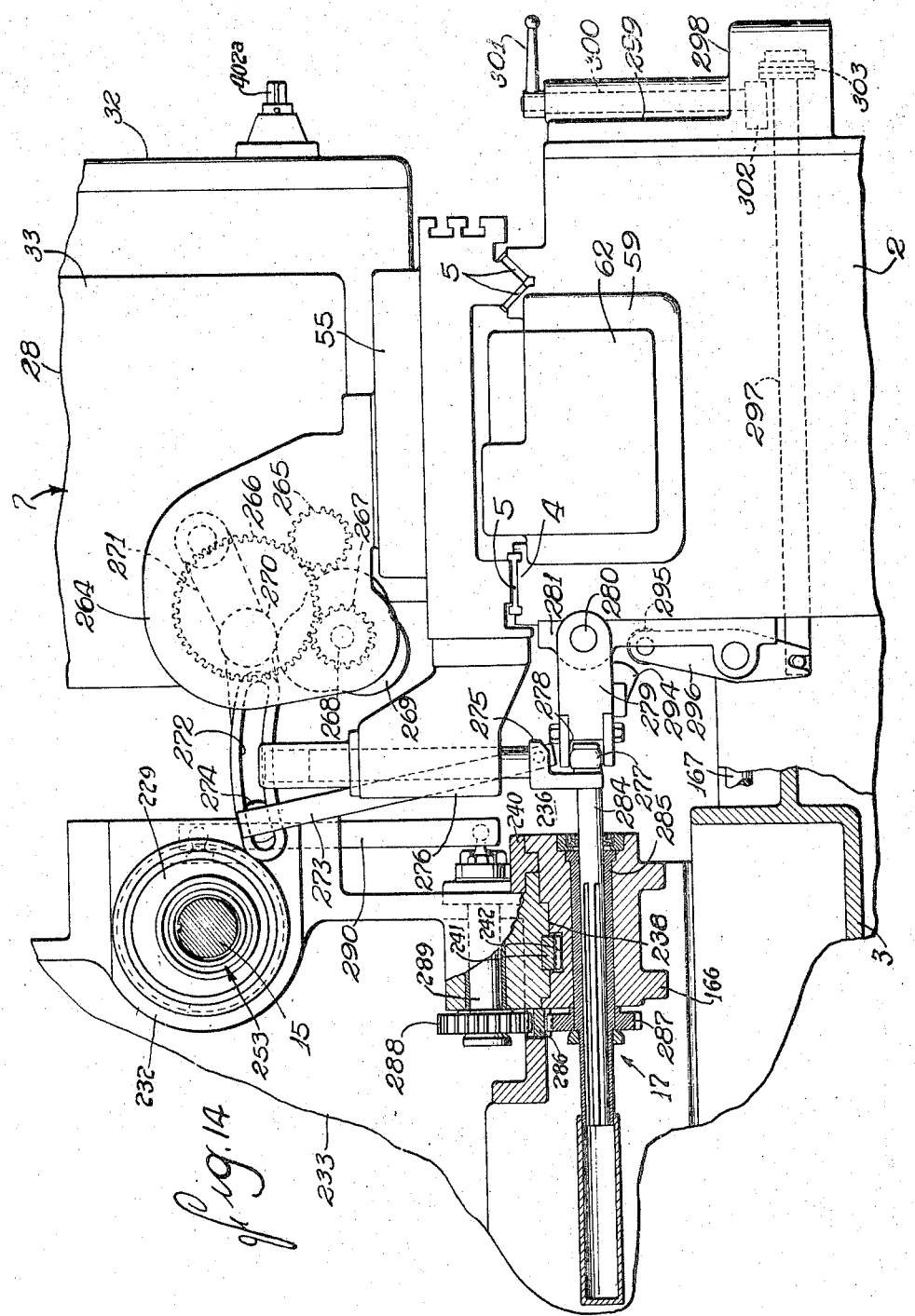

Aug. 12, 1941.      I. J. SNADER      2,251,961
MACHINE TOOL
Filed Dec. 2, 1937      17 Sheets-Sheet 10
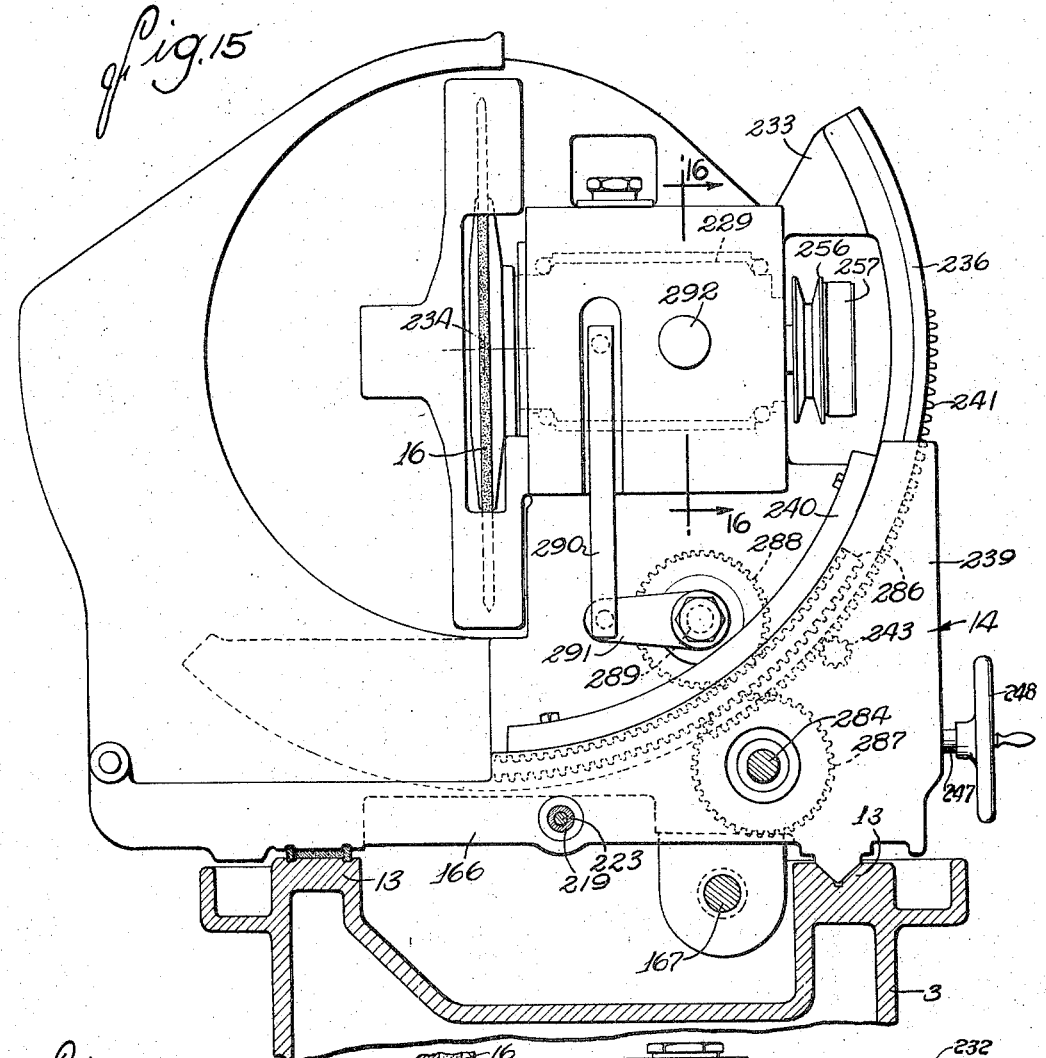
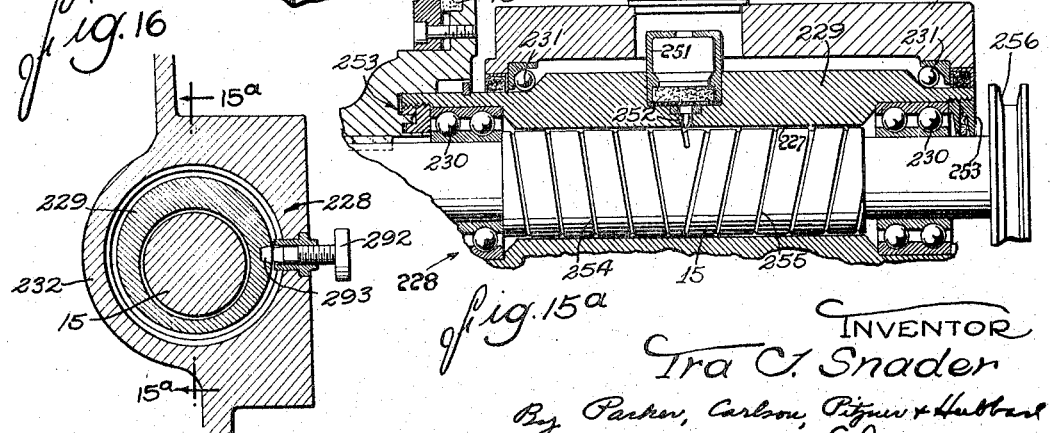

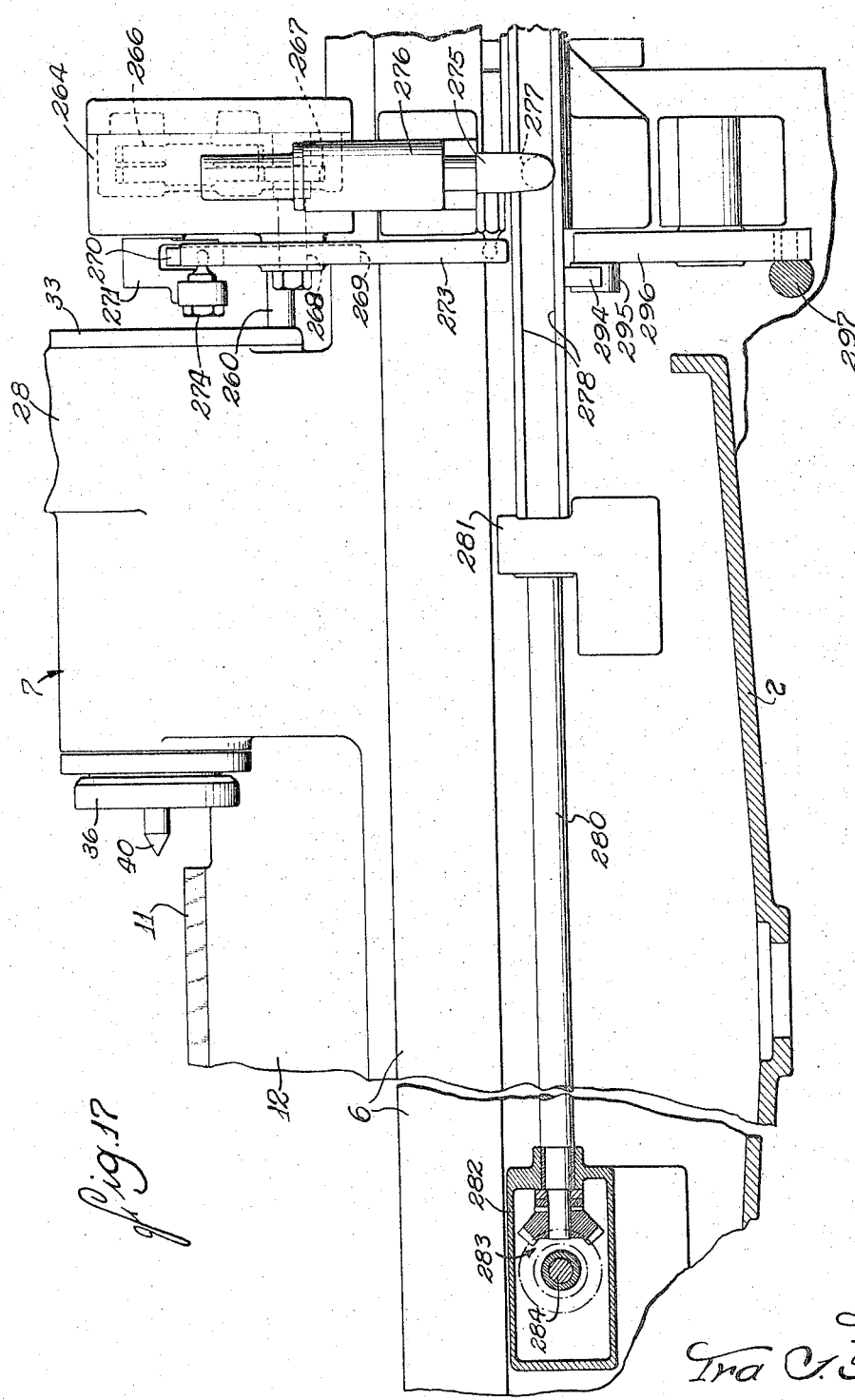

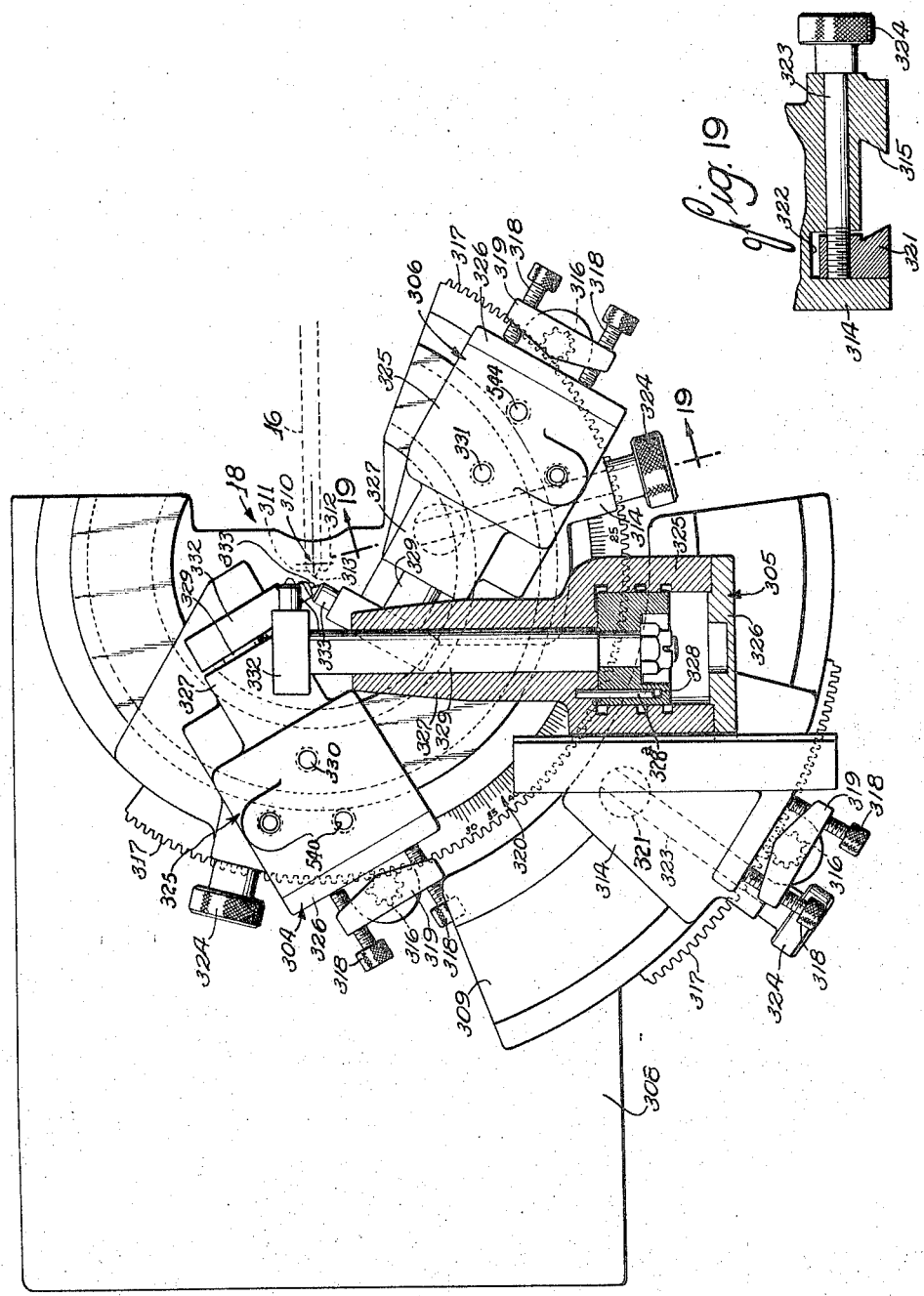

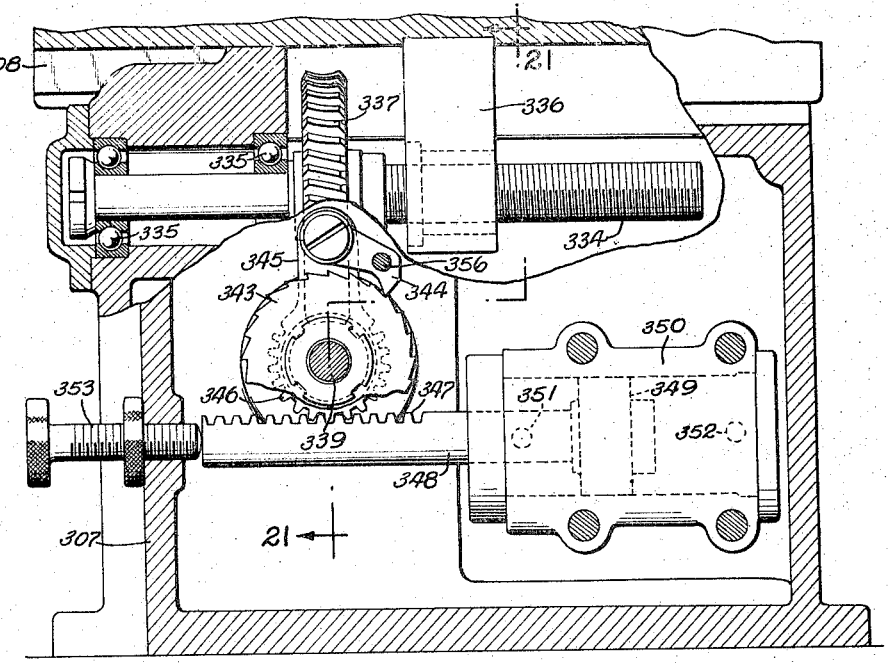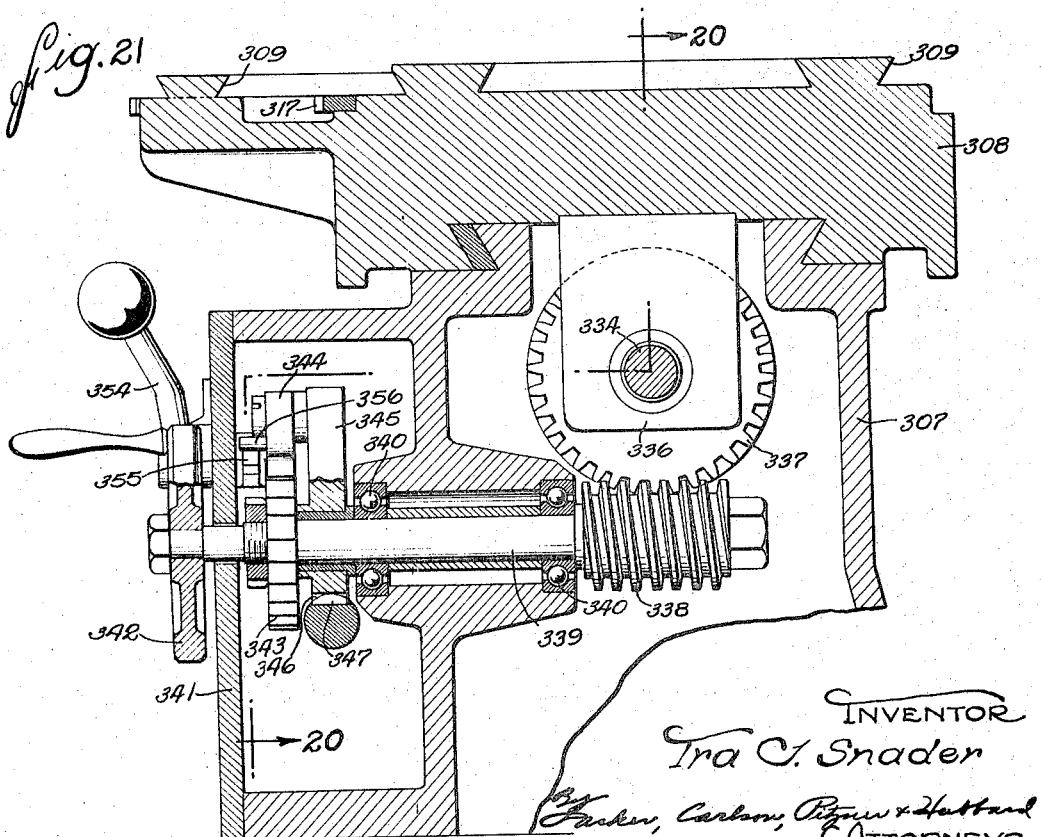

Aug. 12, 1941.  I. J. SNADER  2,251,961
MACHINE TOOL
Filed Dec. 2, 1937  17 Sheets-Sheet 14
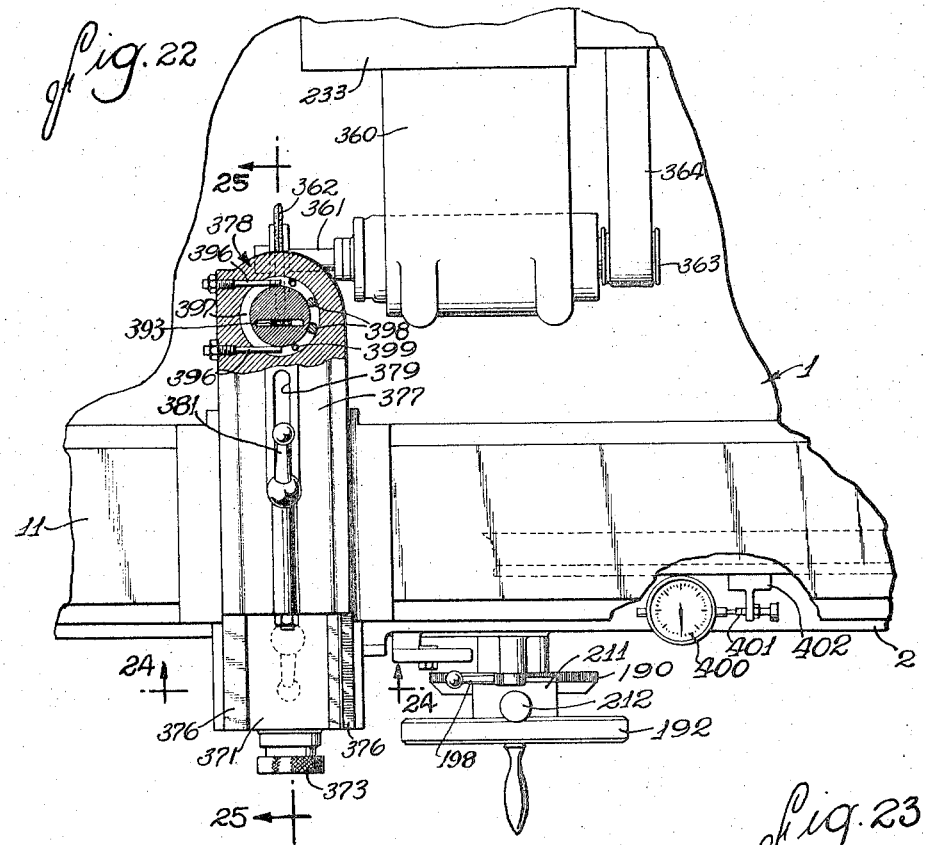
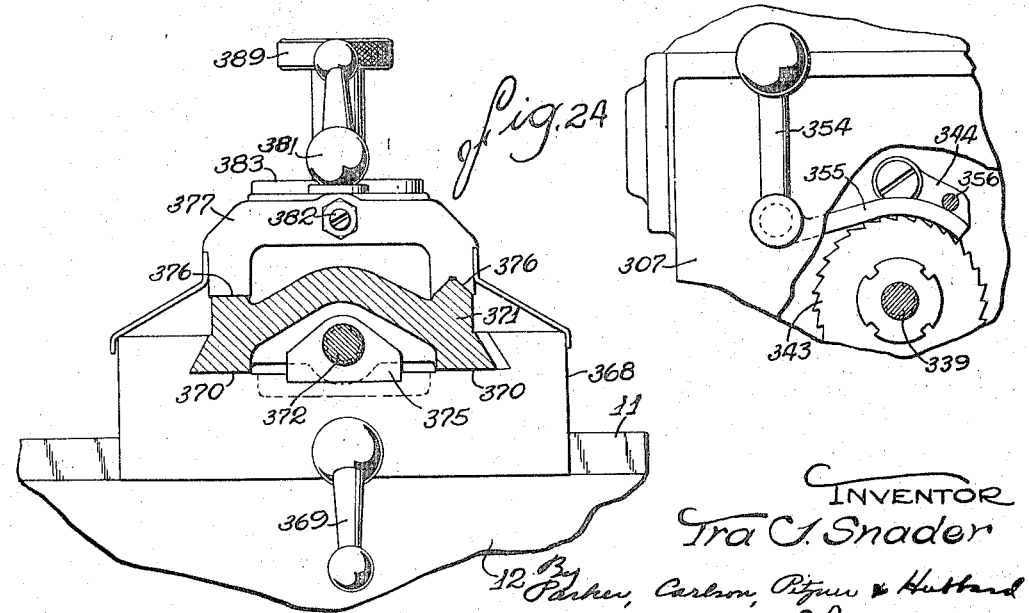

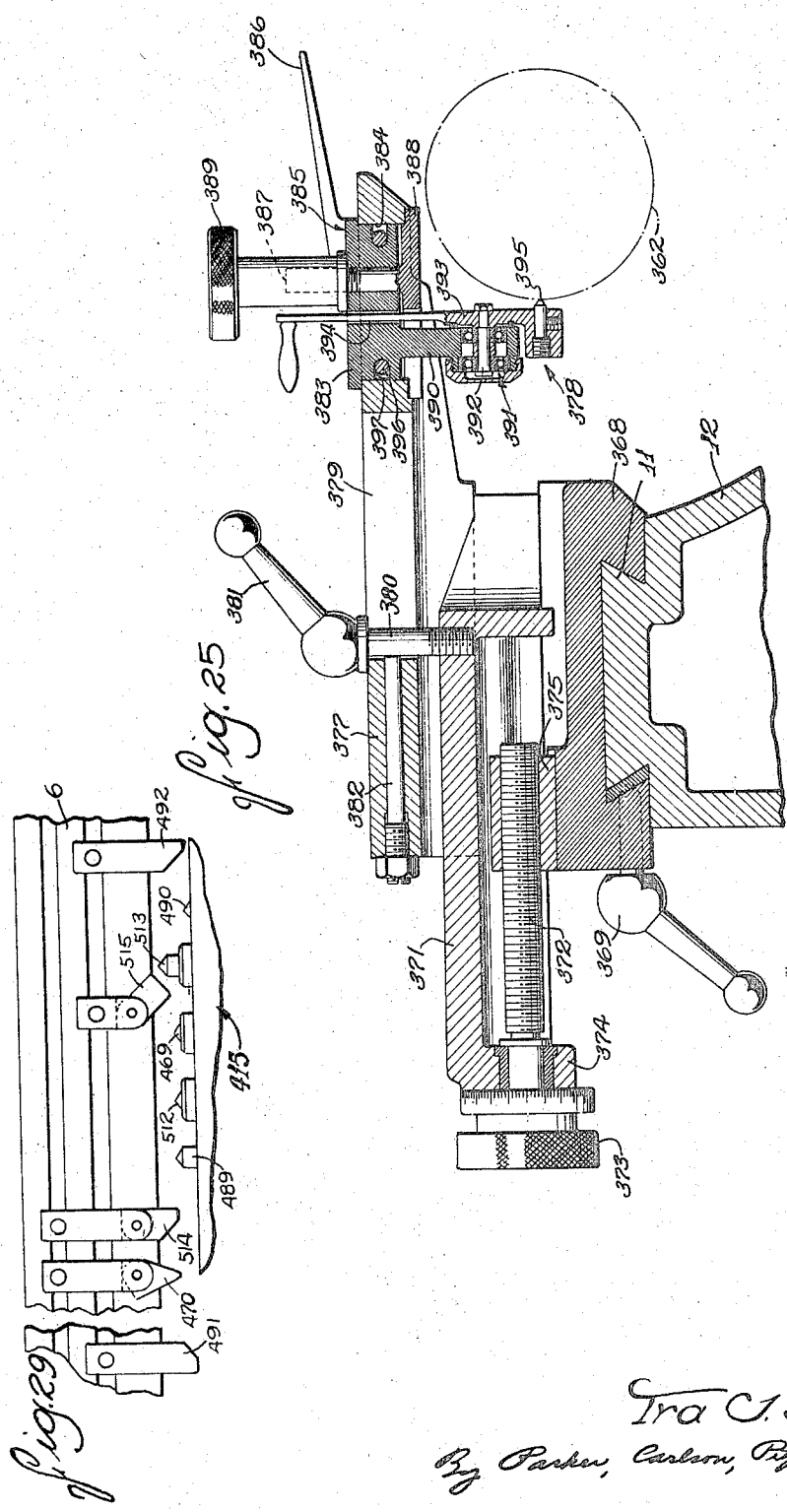

Aug. 12, 1941.　　　I. J. SNADER　　　2,251,961
MACHINE TOOL
Filed Dec. 2, 1937　　　17 Sheets-Sheet 16
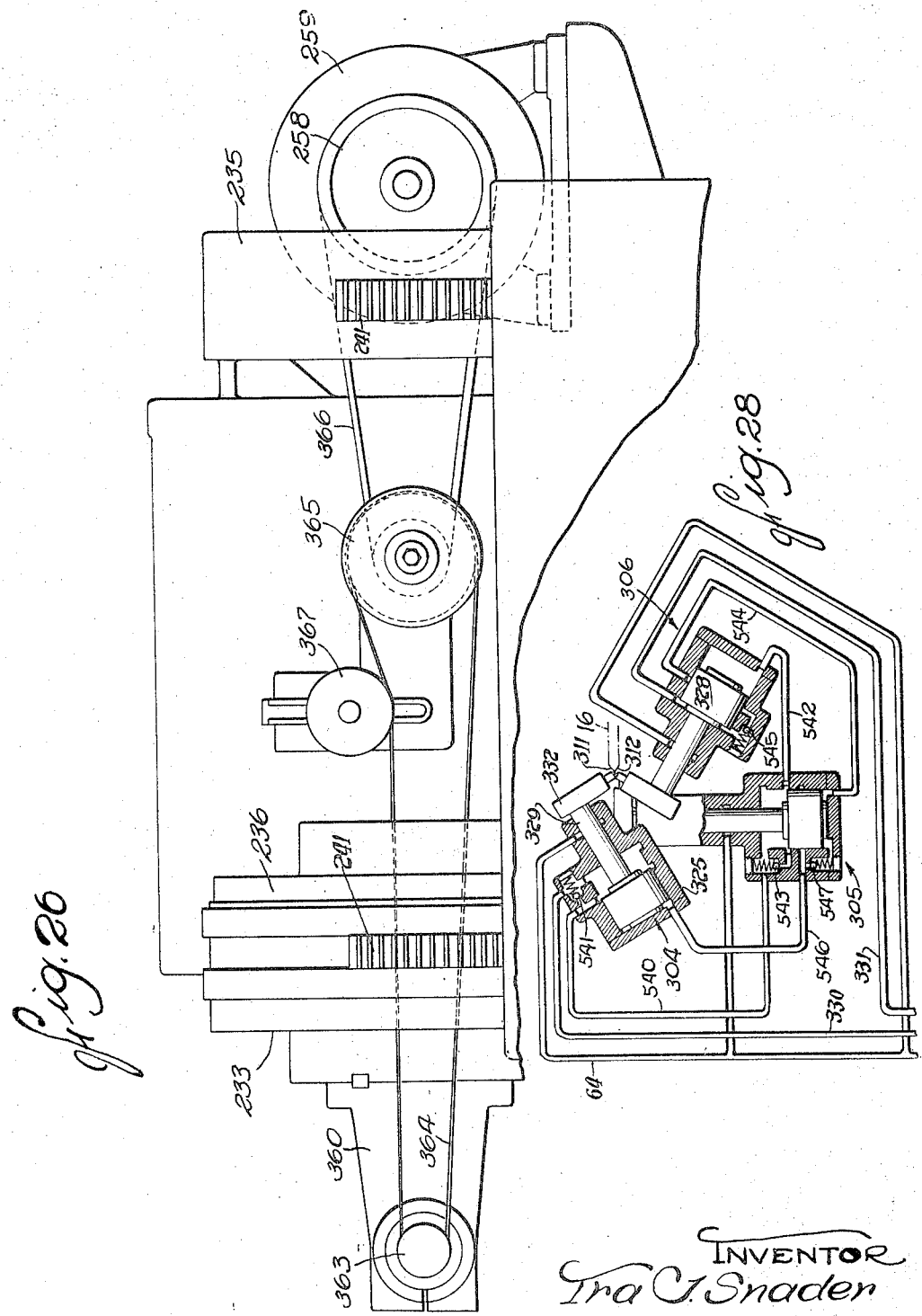
INVENTOR
Ira J. Snader
By Parker, Carlson, Pitzner & Hubbard
ATTORNEYS

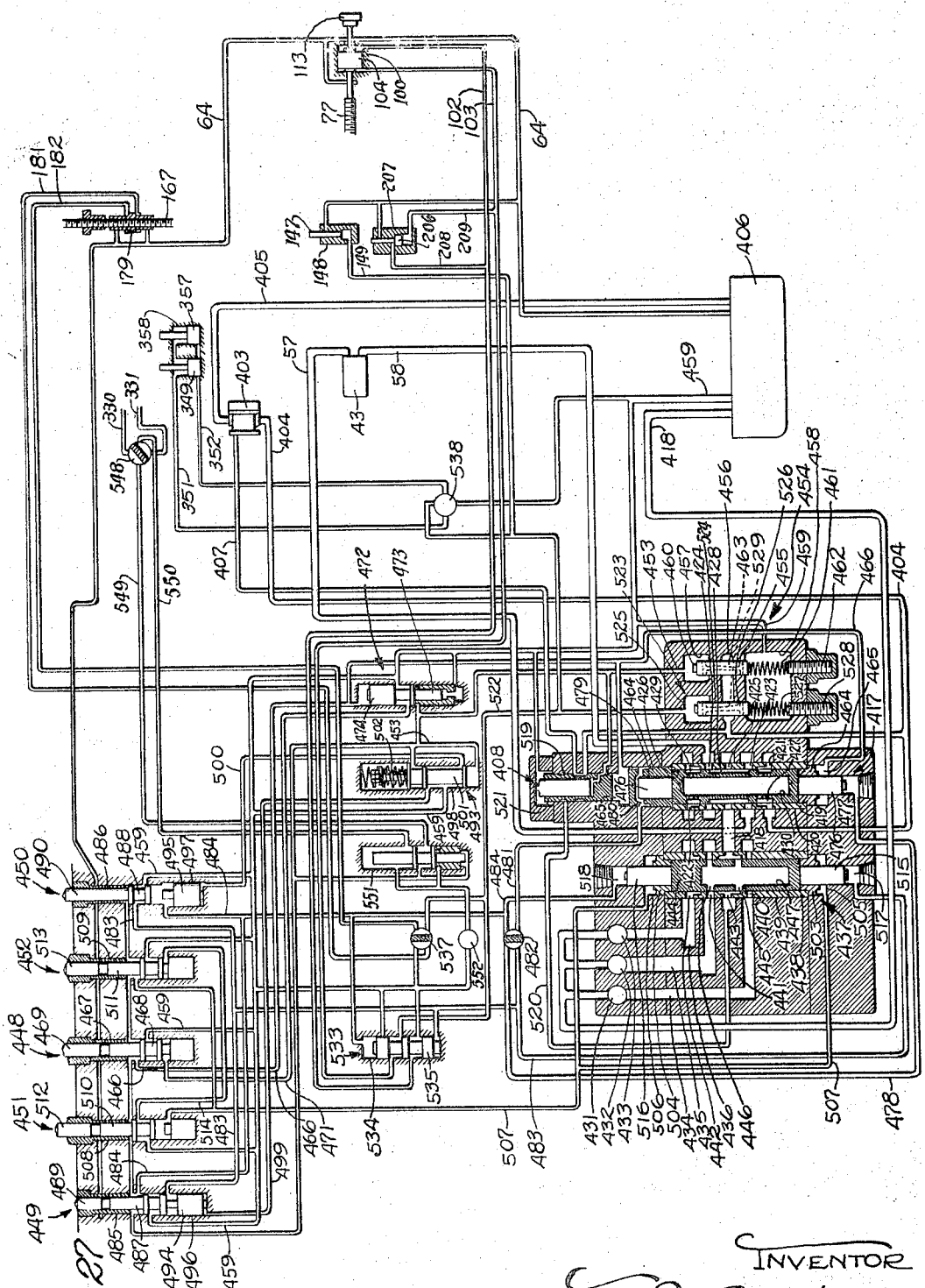

Patented Aug. 12, 1941

2,251,961

UNITED STATES PATENT OFFICE 2,251,961

MACHINE TOOL

Ira J. Snader, Detroit, Mich., assignor to Ex-Cell-O Corporation, Detroit, Mich., a corporation of Michigan Application December 2, 1937, Serial No. 177,693

42 Claims. (Cl. 51—95)

The present invention relates to improvements in machine tools for performing material cutting operations, and has particular reference to a new and improved machine adapted for grinding internal and external screw threads.

One of the objects of the invention is to provide a novel machine adapted to grind screw threads either straight or on a taper, and having means for compensating for the error in lead angle caused by the taper setting.

A further object is to provide a thread grinding machine of the foregoing character having a cross-feed slide for supporting the grinding wheel spindle, and hydraulically controlled means for automatically feeding the slide to a predetermined size setting.

Another object is to provide a new and improved thread grinding machine having a work table translatable by a mechanical drive, a work spindle mounted thereon, a rotary hydraulic motor for operating said drive and said spindle in timed relation, and means for compensating for blacklash in said drive.

Another object is to provide a novel grinding wheel support which is adapted to be fed transversely of the work, and which is angularly adjustable to position the grinding wheel in accordance with the helix angle of the thread to be ground.

A further object is to provide novel means available at will for imparting a back-off reciprocation to the grinding wheel in timed relation to the rotation of the work spindle and in any position of the grinding spindle.

Another object is to provide a thread grinding machine having various hydraulic units, and including novel telescoping connections for directing fluid in the passages to and from said units.

Still another object is to provide a thread grinding machine having a grinding spindle adjustable into different angular positions relative to a horizontal plane.

Further objects and advantages will become apparent as the description proceeds.

Fig. 4 is a vertical sectional view of the headstock taken along line 4—4 of Fig. 1.

Fig. 5 is a fragmentary sectional view taken along line 5—5 of Fig. 4.

Fig. 6 is a fragmentary substantially vertical sectional view taken along line 6—6 of Fig. 4, and illustrating the mounting and drive for the headstock spindle.

Fig. 7 is a fragmentary horizontal broken sectional view of the work table illustrating particularly a taper compensating mechanism.

Fig. 8 is a fragmentary elevational view of the taper compensating mechanism.

Fig. 9 is a fragmentary vertical sectional view of the work table, and particularly the means for supplying pressure fluid thereto.

Fig. 9a is a fragmentary vertical sectional view taken along line 9a—9a of Fig. 4.

Fig. 10 is a fragmentary detail sectional view on an enlarged scale of the feed screw drive for the tool fixture.

Fig. 11 is a fragmentary transverse vertical sectional view of the machine through the work table and the taper compensating mechanism.

Fig. 12 is a fragmentary front elevational view, partially in section, along lines 12—12 of Fig. 11, and illustrating the cross feed mechanism.

Fig. 13 is a fragmentary sectional view of the cross feed mechanism taken substantially along line 13—13 of Fig. 12.

Fig. 14 is a fragmentary left end view of the machine, partially in section, and illustrating the black-off mechanism.

Fig. 15 is a fragmentary vertical sectional view of the tool fixture.

Fig. 15a is an axial sectional view of the tool spindle and mounting.

Fig. 16 is a fragmentary detail sectional view taken along line 16—16 of Fig. 15.

Fig. 17 is a fragmentary rear elevational view of the headstock and back-off mechanism.

Fig. 18 is a fragmentary plan view, partially in horizontal section, of the dressing mechanism for external grinding.

Fig. 19 is a detail sectional view taken substantially along line 19—19 of Fig. 18.

Fig. 20 is a longitudinal vertical sectional view of the dressing mechanism taken substantially along line 20—20 of Fig. 21.

Fig. 21 is a transverse vertical sectional view of the dressing mechanism taken substantially along line 21—21 of Fig. 20.

Fig. 22 is a plan view, partially in horizontal section, of a modified form of dressing mechanism adapted for internal grinding.

Fig. 23 is a fragmentary view of the dressing mechanism illustrated in Fig. 21.

Figure 1:
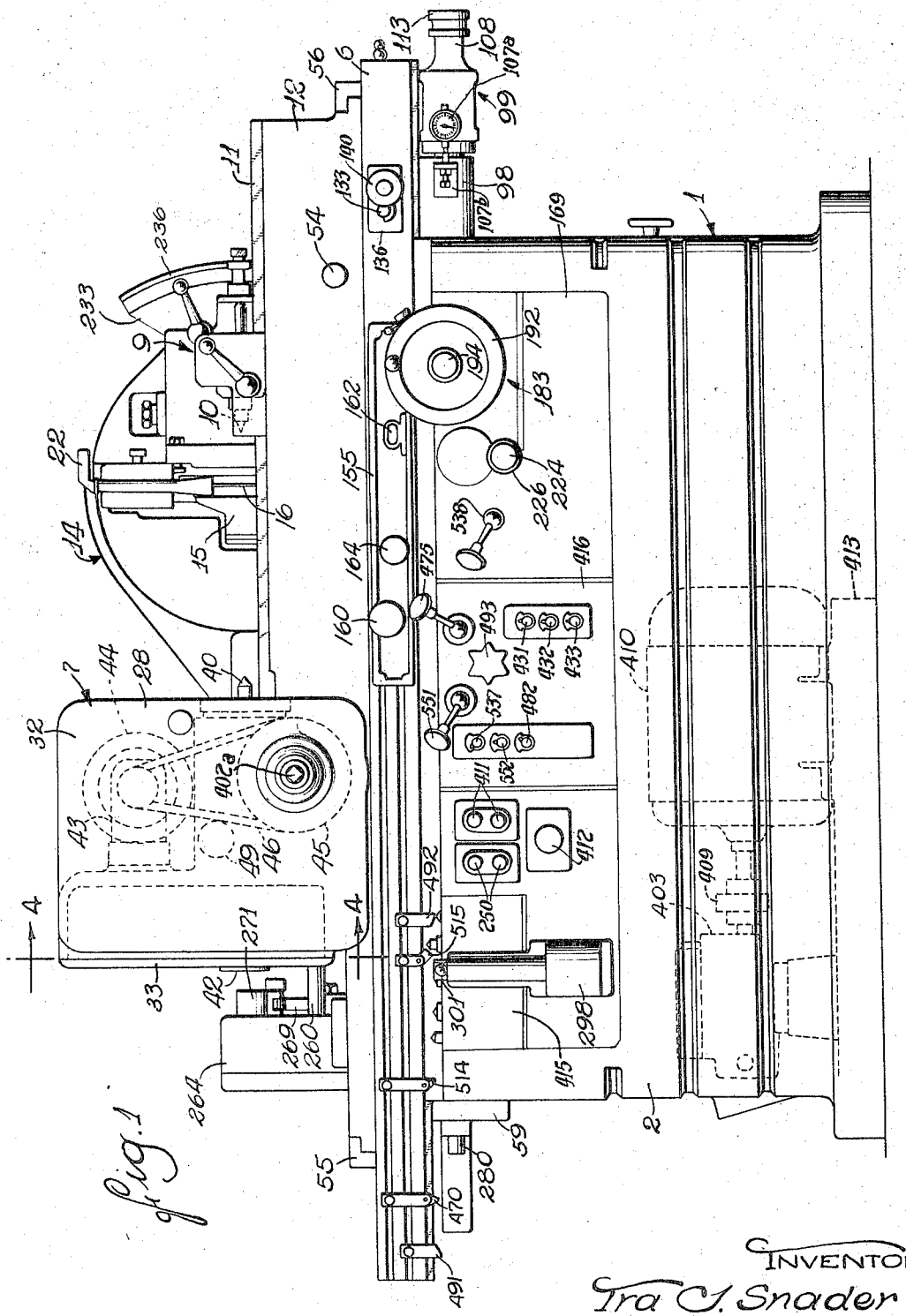
Figure 1 is a front elevational view of the machine embodying the features of my invention.

Figs. 24 and 25 are vertical sectional views taken respectively along lines 24—24 and 25—25 of Fig. 22.

Fig. 26 is a right end elevational view of the internal grinding spindle drive.

Fig. 27 is a diagrammatic representation of the hydraulic circuits for the machine.

Fig. 28 is a diagrammatic representation of the hydraulic circuits for the dressing mechanism illustrated in Fig. 18.

Fig. 29 is a fragmentary view on an enlarged scale of the table dogs for controlling the machine cycle.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the machine, constituting the exemplary embodiment of the invention, comprises a base 1 which may be of any suitable form, and which preferably is horizontal and angle-shaped, with an elongated front section 2 and a rearwardly extending section 3 at one end. The top of the base section 2 is formed with longitudinal ways 4 provided with antifriction rollers 5 on which a work carriage or table 6 is suitably mounted for reciprocation. A headstock 7, having a power driven work spindle 8, is mounted on the carriage 6 for movement therewith, and is pivotally adjustable to adapt the machine for either cylindrical or taper grinding. A tailstock 9, having a work engaging center 10 in axial alignment with the spindle 8, may be adjustably mounted on longitudinal ways 11 formed on the top of an elongated frame extension 12 of the headstock 7. The top of the rear base section 3 is formed with horizontal ways 13 extending transversely of the ways 4, and on which a tool fixture 14 is mounted for cross feed and adjustment. The fixture 14 has a power driven spindle 15 which is adapted to support a suitable grinding element or wheel 16 for operative engagement with the work, and which is angularly adjustable to compensate for the lead angle of the work thread when grinding screw elements. A back-off mechanism 17 incorporated in the fixture 14 is selectively available to impart a relief reciprocation to the spindle 15 transversely of the spindle 8 and in timed relation to the rotation of the latter when relief grinding toothed elements. Mounted on the fixture 14 is a dressing mechanism 18 for shaping and truing the grinding wheel 16 in accordance with the requirements of the work to be ground.

A coolant pump 19, supported by a bracket 20 on the rear of the base 1, is driven by a motor 21, and is adapted to supply coolant under the control of a valve 22 to the grinding wheel 16. The base 1 is provided in one side with suitable compartments having hinged covers 23 and adapted for the storage of change gears and other accessories. A lubricating pump 24 having an outlet sight gauge 25 and a return sight gauge 26 is mounted in the base 1 between the covers 23.

The headstock

Figure 2:
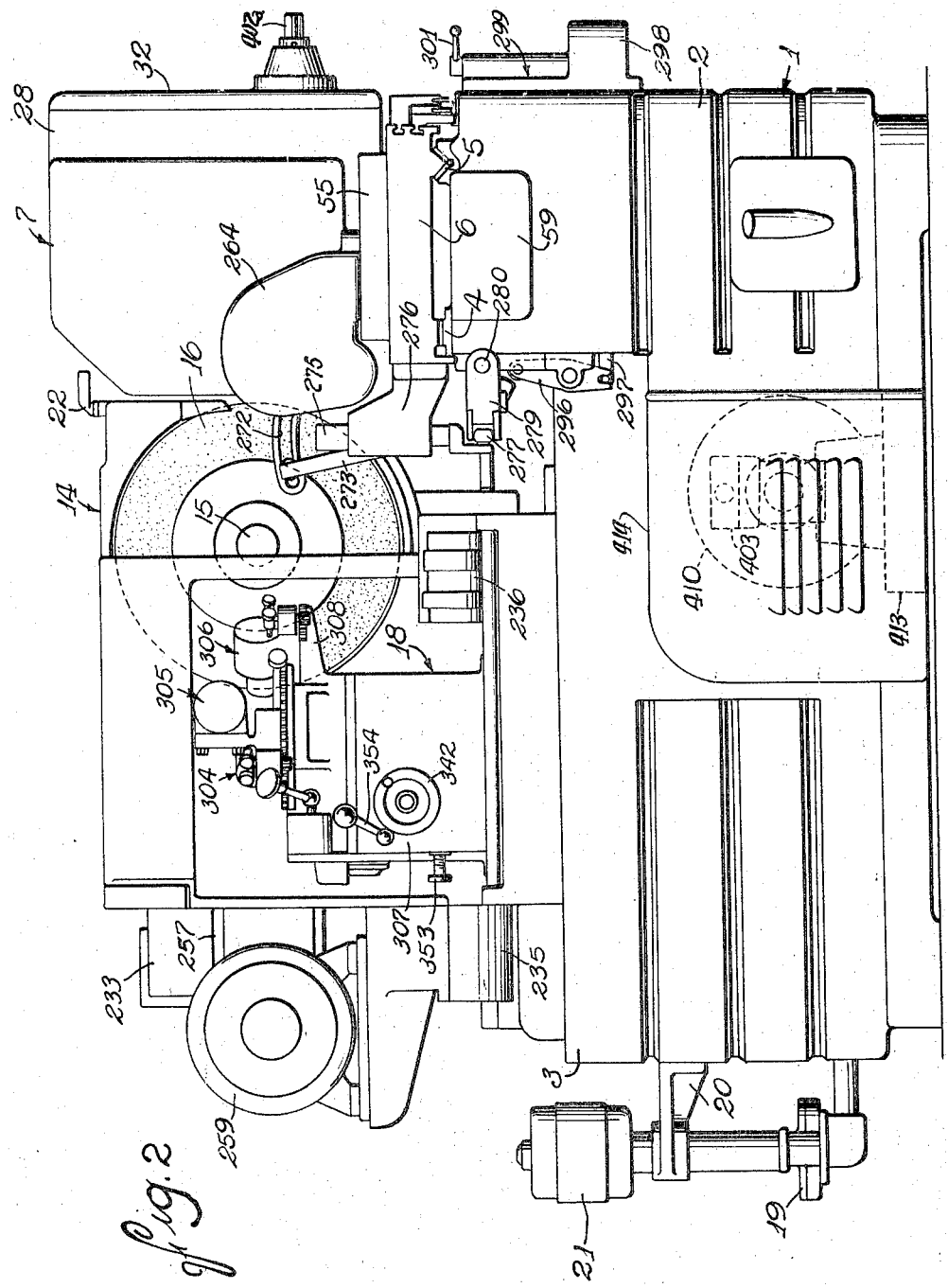
Fig. 2 is a left end elevational view of the machine.
Figure 3:
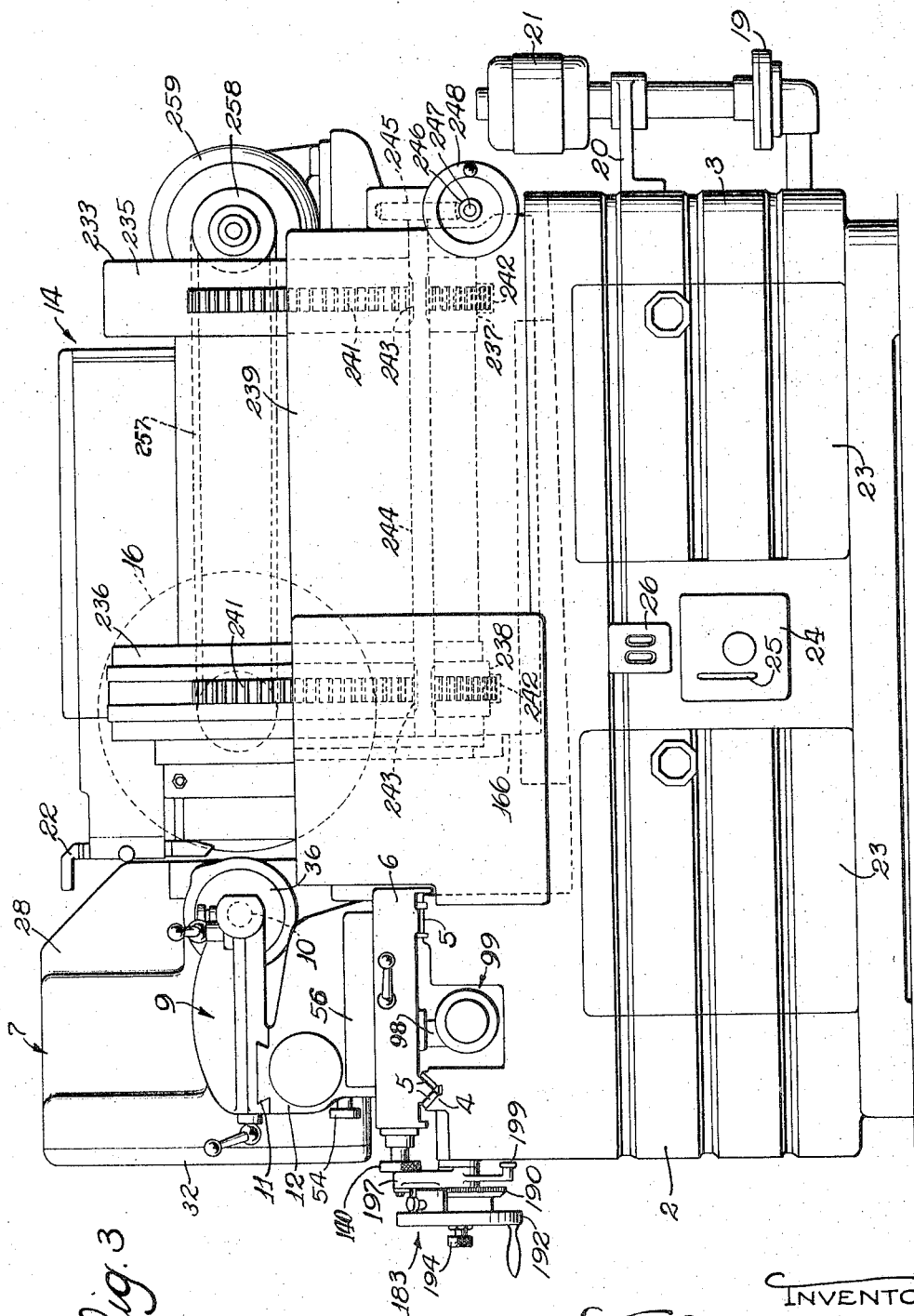
Fig. 3 is a right hand elevational view of the machine.

One end of the headstock 7 (see Figs. 1 to 6) is formed with a hollow upstanding spindle housing 28 formed internally with a drive compartment 29 and a change gear compartment 30 separated by an intermediate wall 31. The compartment 29 is closed at the front by a removable cover 32, and the compartment 30 is closed at the end by a removable cover 33. The spindle 8 is journaled adjacent opposite ends in suitable antifriction bearings 34 and 35 mounted respectively in the end walls of the compartment 29, and preferably is tubular and of the flange nose end type. Thus, the outer or operative end of the spindle 8 is provided with a flange 36 formed with an axial locating bore or recess 37 to mount a work fixture such as a chuck (not shown). The outer end portion of the spindle bore is tapered to form a socket 38 for a sleeve 39 into which a work center 40 may be removably inserted. An opening 41 in the cover 33 for the compartment 30 and normally closed by a removable plate 42 affords access to the inner end of the spindle 8 and permits inserting long work pieces through the spindle.

Rigidly mounted within the drive compartment 29 is a motor 43 which in the present instance is of the rotary hydraulic type. The motor 43 is connected through step pulleys 44 and 45 and a belt 46 to a transverse worm shaft 47 journaled in antifriction bearings 48. An idler pulley 49 serves to tension the belt 46. A worm 50 on the shaft 47 meshes with a worm wheel 51 fixed on the spindle 8 between the bearings 34 and 35 to complete the rotary drive transmission.

The elongated headstock 7 is mounted on the table 6 for pivotal adjustment about a vertical axis to permit either cylindrical or taper grinding. More particularly, a tubular pivot sleeve 52 is fixed in the bottom of the housing 28, and is swiveled in a sleeve 53 in the table 6. Pivotal adjustment of the headstock 7 may be effected by any suitable means operable by a hand knob 54 at the front of the table 6, and the headstock is adapted to be clamped in position of adjustment by suitable gibs 55 and 56 slidably overlying the extreme ends. The gib 56 most remote from the pivotal axis may be provided with suitable graduations for indicating the taper adjustment.

Fluid under pressure is adapted to be supplied reversibly to the motor 43 through lines 57 and 58. To connect these lines to the motor without necessitating the use of a perishable flexible hose, a manifold plate 59 (see Figs. 9 and 9a) is bolted to the left end of the base section 2 below the table 6. The plate 59 is formed with three parallel bores 60 opening therethrough longitudinally of the base section 2 to a recess 61 normally closed by a cover 62, and with three passages 63 peripherally intersecting the bores. Two of the passages 63 are connected respectively to the lines 57 and 58 and the third is connected to a drain line 64. Anchored at their outer ends with a fluid tight seal to the manifold block 59, in communication respectively with the bores 60, are three parallel tubes 65 which are plugged or closed at their inner ends and which extend freely through three parallel bores 66 opening longitudinally through an elongated manifold block 67 on the underside of the table 6.

Each of the tubes 65 is secured to the manifold plate 59 by a bolt 68 extending through the associated bore 60 into internally threaded engagement with the tube and accessible in the recess 61. The bolt 68 is tubular and closed at the head end so as to constitute in effect an extension of the tube 65, and is formed with a plurality of radial ports 69 open to the associated passage 63. The bore 66 in the manifold block 67 is of a larger diameter than the tube 65 to provide a peripheral fluid space. Plain bushings 70 are fixed in the bore 66 adjacent the outer ends and have a close sliding fit with the tube 65 to provide a guide and a hydraulic seal. Suitable square wire snap rings 70a are inserted into internal grooves 70b in the bore 66 in position to engage the outer ends of the bushings 70 and thereby anchor the latter against the high fluid pressure in the bore between the bushings. Additional peripheral seals 71 are provided in the ends of the bore 66 in axially spaced relation to the bushings 70, and coact with the latter to define small intermediate annular spaces or chambers 72 adapted to collect any outwardly leaking fluid. The tube 65 is formed with radial ports 73 which open from the interior thereof to the associated bore 66.

The various chambers 72 at the ends of the bores 66 are connected through passages 74 in the manifold block 67 to one of the bores 66 in communication with the drain line 64 so as to provide an outlet for the leakage of fluid. The other two bores 66 are in communication with passages 75 opening through the block 67, the pivot sleeve 52 and the housing 28, respectively, to opposite sides of the motor 43. It will be evident that the various tubes 65 and the block 67, by reason of their telescoping relationship, serve to connect the fluid lines 57 and 58 and the drain line 64 to the carriage 6 in any position of reciprocation of the latter, and that the passages 75 in opening through the sleeve 52 permit angular adjustment of the headstock without interfering with the connection of the fluid lines 57 and 58 from the carriage to the motor 43.

The table drive

Translation of the table 6 (see Figs. 7 and 11) is effected through a nut 76 and a lead screw 77 which are mounted for relative rotation, and of which one is fixed to the base section 2 and the other is movable with the table. In the present instance, the nut 76 is supported in a normally fixed position in a sleeve 78 on the upper end of an upstanding bracket 79 rigidly mounted on a wall 80 within the base section 2, and the screw 77 is supported for a rotary drive on the underside of the table 6. One end of the screw 77 is freely splined for relative axial adjustment in a sleeve 81 rotatably mounted in antifriction bearings 82 confined in a lug 83 on the side of the manifold block 67. The sleeve 81 is operatively connected for rotation in timed relation to the work spindle 8. In the present instance, the drive connection (see Figs. 4, 5 and 6) includes a gear 84 fixed on the inner end of the spindle 8 within the gear compartment 30 of the headstock housing 28. The gear 84 is connected through suitable change gears 85 to a shaft 86 journaled in the wall 31. The change gears 85 are adjustably and removably mounted on a quadrant 87 pivoted on the shaft 86 and adapted to be clamped to the wall 31 in position of adjustment by means of a bolt 88. Bevel gears 89 serve to connect the shaft 86 to a vertical shaft 90 extending downwardly coaxially through the pivot sleeve 52 and supported therein by suitable antifriction bearings 91. The lower end of the shaft 90 is connected through bevel gears 92 to the sleeve 81, thereby completing the drive to the lead screw 77. By proper selection of the change gears 85, the relative speed and relative direction of rotation of the spindle 8 and the table lead screw 77 may be varied as required.

The bottom of the gear compartment 30 constitutes a reservoir adapted to contain a lubricant for the gearing therein. An oil pump 93 is mounted in the bottom of the compartment 30, and is driven by a cam 94 on the spindle 8. The pump 93 has an intake 95 below the oil level, and an outlet line 96 discharging in the top of the compartment above the gearing.

The right end of the lead screw 77 is adjustably anchored in a fixed axial position relative to the table 6. As herein shown, the right end shaft extension of the lead screw 77 extends slidably and rotatably through an elongated bearing sleeve 97 which is secured for axial adjustment in a lug 98 on the underside of the table 6. A backlash compensating device 99 is mounted on the sleeve 97, and takes the end thrust of the lead screw 77. Preferably, the device 99 is selectively operable to compensate for backlash in either direction between the nut 76 and the screw 77 and in the gear drive.

The backlash device 99 comprises a cylinder 100 which is mounted at one end on a flange 101 on the sleeve 97, and which has connections 101 at opposite ends with pressure fluid supply lines 102 and 103. A piston 104 is reciprocable in the cylinder 100, and is connected to the shaft extension of the lead screw 77. In the present instance, the connection comprises a collar 105 secured to the screw 77, and retained for rotation between antifriction end-thrust bearings 106 in the piston 104. An adjustment screw 107 is threaded through a tubular extension 108 on the closed outer end of the cylinder 100, and has a stop 109 on the inner end disposed for engagement by the piston 104 to limit the stroke or range of movement of the latter. The adjustment screw 107 is placed under a frictional tension load to eliminate lost motion by a nut 110 threaded thereon within an axial recess 111 in the outer end of the tubular extension 108 and urged outwardly by coil compression spring means 112. A hand knob 113 is fixed on the outer end of the screw 107. An indicator 107a is mounted on the cylinder 100 of the device 99 and coacts with a bracket 107b on the lug 98 to facilitate adjustment of the range of movement of the piston 104 by means of the screw 107. This indicator also facilitates accurate adjustment to pick up previously ground threads for removing a very small amount of stock. In use, the stop 109 is so positioned by adjustment of the screw 107 with the aid of the indicator 107a that the stroke of the piston 104 equals the total backlash from the spindle 8 to the screw 77, including the backlash in the gearing 85 and 92 and the backlash between the nut 76 and the screw 77 and between the nut 76 and the support 78. Hydraulic pressure fluid is supplied selectively through one or the other of the lines 102 and 103 to shift the screw 77 relatively to the table 6 and thereby compensates for the total backlash. Upon reversing the table 6, the take-up on the screw 77 is also reversed to move the table ahead in the new direction of travel an adjustable extent corresponding to the backlash so that the cutting path of the grinding wheel 16 will be exactly the same in both directions of table movement. Therefore, it is possible to grind in both directions and to reverse the work drive and table movement at the end of the cut without backing away the wheel, or running the wheel off the end of the work or into an undercut at the end of the threaded portion of the work.

Since the backlash device 99 is an auxiliary mounted on the table 6, the lines 102 and 103 to the cylinder 104 are connected through the manifold block 67 in the same manner as the lines 57 and 58 to the spindle motor 43. Thus, the block 67 is formed with two longitudinal bores 114 connected through passages 115 respectively to opposite ends of the cylinder 104. Two tubes 116 are relatively reciprocable in guide bushings 117 and seals 118 in the outer ends of the bores 114, and are formed with radial ports 119 intermediate their ends. Leakage chambers 120 between the bushings 117 and seals 118 are connected through passages 121 to the drain bore 66. The fixed ends of the tubes 116 are connected to the manifold plate 59 by means of bolts 122 which extend through bores 123 in the plate and which have radial ports 124 open to passages 125 intersecting the bores and connected respectively to the lines 102 and 103.

Provision is made for axially adjusting the sleeve 97 in the lug 98 so as to shift the table 6 relatively to the screw 77, and thereby locate the table accurately in relation to the grinding wheel 16. Consequently, the thread of a work piece that has been previously rough ground may be brought conveniently and accurately into proper registration with the grinding wheel 16 for finish grinding. The adjustment is facilitated by the indicator 107a. The means for effecting such adjustment comprises a longitudinal gear rack 126 formed on the sleeve 97 and meshing with two spaced pinions 127 and 128 journaled in a bracket 129 rigid with the table 6. Two transverse gear sectors 130 and 131 are operatively disposed against opposite sides of a guide member 132, and mesh respectively with the adjacent sides of the pinions 127 and 128. Two adjusting screws 133 and 134 are threaded through the front of the carriage 6 into abutting engagement with the front edges of the gear sectors 130 and 131. Splined on the front ends of the screws 133 and 134 within a recess 135 closed by a cover plate 136 are two intermeshing pinions 137 and 138. The pinion 138 has a hub 139 extending outwardly through the plate 136 and provided with a hand knob 140, and is axially movable into and out of engagement with the pinion 137. A coiled compression spring 141 tends to urge the pinion 138 outwardly.

Upon rotation of the knob 140 in its outermost position, the screws 133 and 134 are rotated simultaneously in opposite directions, and act through the gear sectors 130 and 131, the pinions 127 and 128 and the rack 126 to adjust the sleeve 97 relatively to the lug 98. Since the gear sectors 130 and 131 are interconnected, they will move in opposite directions, one being actuated by the inwardly moving screw, and the other following the outwardly moving screw. After adjustment, the sleeve 97 may be locked in position by pushing the knob 140 inwardly to disengage the pinions 137 and 138, and rotating the knob and screw 134. As a result, the assembly will be locked against the screw 133.

Angular adjustment of the headstock 7 for taper grinding results in a lead error. To compensate for this error, means is provided for adjusting the nut 76 axially in timed relation to the table feed (see Figs. 1, 7, 8 and 11). To this end, the nut 76 is threaded for rotary adjustment in the sleeve 78, and is provided with a vertical lever 142. A contact or follower plate 143 is held by spring means 144 for universal adjustment in a spherical socket 145 in the upper end of the lever 142, and slidably engages a longitudinal sine bar 146 adjustably mounted on the underside of the table 6. Engagement between the contact plate 143 and the bar 146 is maintained by hydraulic pressure exerted through a plunger 147 against the lower end of the lever 142. The plunger 147 is movable in a cylinder 148 rigid with the bracket 79 and having a pressure inlet line 149.

The sine bar 146 is pivoted on a pin 150 intermediate its ends to the table 6 for adjustment into different angular positions. For straight grinding, the bar 146 is adjusted into parallelism with the direction of feed, and the nut 76 is held in fixed position. For taper grinding, the bar 146 is adjusted into a selected inclined position correlated in direction and extent to the angular adjustment of the headstock 7.

The means for adjusting the sine bar 146 comprises a cam member 151 longitudinally slidable in a guideway 152 in the front of the table 6, and formed on opposite ends respectively with two rearwardly facing and equally but oppositely inclined wedge faces 153 and 154. The cam member 151 is slidably confined within the guideway 152 by a front cover plate 155. Extending slidably through the front of the table 6 into the guideway 152 for engagement at their front ends respectively with the wedge faces 153 and 154 are two follower pins 156 and 157. The rear ends of the pins 156 and 157 engage opposite ends of the sine bar 146 at points equally spaced from the pivot pin 150. The cam member 151 is formed along the top with a longitudinal gear rack 158 which meshes with a pinion 159 journaled in the table 6 and the cover plate 155, and provided at the front with a hand knob 160. A suitable graduated scale 161 on the front of the cam member 151 is visible through and coacts with an opening 162 in the cover plate 155 to indicate the taper adjustment. A clamp bolt 163, having a hand knob 164 at the front of the plate 155, extends through a longitudinal slot 165 in the cam member 151 into threaded engagement with the table 6, and is available to lock the sine bar 146 in position of adjustment.

Upon rotation of the knob 160, the cam member 151 will act through the pins 156 and 157 to adjust the sine bar 146. If the bar 146 is inclined, it will rotate the nut 76 to impart an additional axial movement to the screw 77 sufficient to compensate for the lead error set up by inclination of the work axis. The sine bar 146 is also available to modify the axial movement of the screw 77 for the purpose of obtaining thread leads on the work departing slightly from the leads obtainable through selective substitution of the change gears 85.

The cross-feed drive

The tool fixture 14 comprises a base or cross slide 166 movable along the ways 13 by a cross-feed screw 167 (see Figs. 10, 11 and 15). The front end of the screw 167 is journaled and anchored against endwise movement in a preloaded thrust bearing 168 mounted in the inner wall of a gear housing 169 on the front of the base section 2. The rear end of the screw 167 (see Fig. 10) is in threaded engagement with a tubular nut 170 mounted for rotary adjustment in one end of a bore 171 in a cylinder block 172 attached to the underside of the slide 166. A gib plate 173 is bolted to one end of the block 172, and engages a peripheral flange 174 on the nut 170 to confine the latter against endwise movement in the bore 171. A worm wheel 175 is fixed on the nut 170 externally of the plate 173, and meshes with a worm 176 adapted to lock the nut against rotation and available to rotate the nut when a compensatory feed modifying the normal feed of the screw 167 is desired.

The front end of the bore 171 in the block 172 is enlarged to define a backlash compensating cylinder 177 closed by a cover plate 178. A piston 179 is reciprocable in the cylinder 177, and has reduced end extensions slidable in the bore 171 and the plate 178. The piston 179 is in threaded engagement with the screw 167, and is held against rotation by a pin 180 on the plate 178. Pressure fluid lines 181 and 182 open to the ends of the cylinder 177 at opposite sides of the piston 179. Backlash between the screw 167 and nut 170 is taken up by directing fluid under pressure to one side of the piston 179. Thus, pressure fluid is supplied through the line 182 to force the slide 166 rearwardly for external grinding, and through the line 181 to force the slide forwardly for internal grinding.

The cross feed screw 167 is adapted for operation either manually or automatically by a feeding mechanism 183 (see Figs. 11 to 13). This mechanism comprises a feed shaft 184 journaled in a bushing 185 in the front wall of the gear housing 169, and connected through reduction gears 186, 187, 188 and 189 to the front end of the screw 167. Splined to the outer end of the shaft 184 are a ratchet wheel 190 having a hub 191 disposed against the end of the bushing 185, and a hand wheel 192 disposed against the end of the hub 191. A screw 193 with a knurled hand knob 194 is threaded into the outer end of an axial bore 195 opening through the shaft 184, and a nut 196 on the screw serves to hold the ratchet wheel 190 and hand wheel 192 in position of assembly. Pivotal intermediate its ends on the extended end of the bushing 185 is a pawl lever 197. A gravity pawl 198 is pivoted to the uppermost end of the lever 197 for engagement with the ratchet wheel 190. The lowermost end of the lever 197 is pivotally connected to one end of a toggle link 199 which in turn is connected at the other end to an arm 200 by a pivot 201 adjustable along a slot 202 to vary the stroke of the pawl 198 and hence the rate of feed. The arm 200 is fixed on a rock shaft 203 which is journaled in and extends through the front wall of the housing 169. Fixed on the inner end of the shaft 203 is an arm 204 which is pivotally connected to a piston rod 205 rigid with a piston 206 reciprocable in a cylinder 207. The cylinder 207 is mounted within the gear housing 169 and has pressure fluid supply lines 208 and 209 at opposite ends. The arrangement is such that each stroke of the piston 206 in either direction will move the toggle pivot 201 through dead center, and hence will reciprocate the pawl 197 to impart a feed increment to the screw 167. The direction of feed is dependent on whether the pawl 197 is swung to the left or the right into engagement with the ratchet wheel 190. As hereinafter described, pressure fluid is supplied alternately to the lines 208 and 209 to obtain an automatic feed movement at each reversal of the table 6.

A segment 210 is adjustably fixed on the hub 191 for rotation therewith, and has an arcuate shield 211 extending laterally over a portion of the toothed periphery of the ratchet wheel 190 and arranged to engage and lift the pawl 198 to stop the feed automatically at a predetermined point. A clamp pin 212 is threaded in and extends radially through the segment 210 for engagement with the hub 191 to lock the shield 211 in different selective positions of adjustment according to the extent of cross-feed desired.

To provide means for locking the hand wheel 192 against accidental movement when the automatic cross-feed is not in use, the inner end of the screw 193 is provided with an axial pin 213 which is in end camming engagement with two wedges 214 guided in the shaft 184 for radial movement into and out of clamping engagement with an encircling boss 215 on the housing 169.

A cross-feed dial indicator 216, with an actuating stem 217, is mounted in the housing 169 for inspection through a sight glass 218. Extending slidably through the base section 2 for movement with the cross slide 166 is a tubular indicator rod 219 carrying a bracket or contact member 219$^a$ in operative engagement with the stem 217. In the present instance, the rear end of the rod 219 extends with a sliding fit into a bore 220 in the cross slide 166, and the other end is nonrotatably splined for axial movement in a guide bushing 221 in the rear wall of the housing 169. The rear end of the rod 219 is split longitudinally to form yieldable jaws 222 adapted to be expanded by a ball 222$^a$ into clamping engagement with the surface of the bore 220. A rod 223 extends slidably through the indicator rod 219 and is operable to force the ball 222$^a$ into wedging engagement with the jaws 222. A screw 224 is adjustably threaded into the front end of the rod 219, and acts through a ball 225 against the rod 223 to actuate or release the latter. It will be evident that when the indicator rod 219 is disconnected from the cross slide 166 the latter may be moved into any desired position for an initial indicator reading. A fine adjustment between the slide 166 and the indicator 216 may be obtained by means of a nut 226 journaled in the front wall of the housing 169 and adjustably threaded onto the front end of the rod 219 to anchor the latter normally against endwise movement. By means of the indicator 216, the setting of the cross slide 166 for a given work size may be accurately and conveniently duplicated for successive work pieces.

*The tool fixture*

The tool fixture 14 (see Figs. 2, 3, 14, 15 and 16) is adapted to support the tool or grinding wheel 16 on the rotary spindle 15 for presentation to the work. In the present instance, the tool spindle 15 is disposed in a vertical plane substantially parallel to the work table 6, and is angularly adjustable about a transverse axis to position the grinding wheel 16 for the grinding of different thread leads. Provision also is made for imparting a transverse back-off or relieving reciprocation to the spindle 15 and the attached grinding wheel 16 for the relief grinding of toothed elements on fluted work.

More particularly, the grinding spindle 15 is journaled in and forms part of a spindle structure 228 (see Fig. 15$a$) including a cylindrical sleeve or housing 229. This housing has an eccentric bore 227 in which the spindle 15 is supported by ball bearings 230, and is in turn supported at opposite ends by ball bearings 231 for oscillation in a tubular head bracket 232. The housing 229 is held against oscillation when grinding screw threads and the like, and is oscillated as hereinafter described when relief grinding fluted screw threads. The head bracket 232 is rigid with a cradle 233 which is mounted on the base slide 166 for angular or tilting adjustment about a horizontal axis 234 extending diametrically through the grinding wheel 16. In the present instance, the cradle 233 is formed at opposite ends respectively with segmental guides 235 and 236 arcuate about the axis 234 and slidably engaging complemental guideways 237 and 238 in an upstanding side bracket 239 on the slide 166. Suitable arcuate locking gibs 240 are releasably bolted to the bracket 239 for engagement with the guides 235 and 236 to secure the cradle 233 in selected position of adjustment. Formed on the guides 235 and 236 are two arcuate gear segments 241 which project freely into recesses 242 in the bottom surfaces of the guideways 237 and 238, and which mesh respectively with two pinions 243 on an adjusting shaft 244 journaled in the bracket 239. The rear end of the shaft 244 projects from the bracket 239, and is connected through a worm wheel 245 and worm 246 to a shaft 247 extending to one side of the slide 166 and there provided with a hand wheel 248. A graduated quadrant (not shown) on the rear end of the tool fixture 14 facilitates accurate angular adjustment to suit the helix angle of the work.

Referring now to the spindle structure 228, the intermediate portion of the spindle 15 is enlarged and has a close running clearance with a bore 227 in the housing 229. To provide lubrication, an oil reservoir 251 is mounted in the top of the housing 229, and is connected through a passage 252 to the bore 227 substantially midway of the ends. Suitable oil seals 253 are mounted in the ends of the housing 229 to prevent the escape of lubricant. Formed respectively in the opposite end portions of the spindle 15 between the bearings 230 are two peripheral helical oil grooves 254 and 255 of opposite lead. The adjacent ends of the grooves 254 and 255 overlap each other in the transverse plane of the passage 252, and hence act to pick up incoming lubricant. The grooves 254 and 255 are rendered effective by the close clearance with the bore 227 and the relation of the leads to the direction of rotation to force the lubricant outwardly to the opposite end bearings 230 regardless of the direction of inclination of the spindle 15.

Any suitable means may be provided for driving the spindle 15. In the present instance, a pulley 256 is fixed on the outer end of the spindle 15, and is connected by a V-belt 257 to a two-step pulley 258 driven by an electric motor 259 on the rear end of the cradle 233. The motor 259 is controlled by start and stop switches 250 at the front of the base 1.

Back-off drive

For relief grinding either straight or spiral fluted work, the sleeve 229 is adapted to be oscillated in timed relation to the rotation of the work spindle 8 and the translation of the work table 6, thereby imparting a relieving reciprocation to the grinding wheel 16 transversely of the work axis once for each flute during each work revolution. The drive (see Figs. 6 and 14 to 17) comprises a shaft 260 which extends from the gear compartment 30 of the headstock 7 through a bearing 261, and which is therein connected through gears 262 and 263 to the gear 84 on the work spindle 8. The shaft 260 extends into a change gear housing 264 on the headstock 7, and is therein connected through change gears 265, 266 and 267 to a cam shaft 268. By proper selection of these gears, the drive may be adapted for either straight or spiral fluted work, it being understood that for the latter the relieving reciprocation must be compensated for the lead of the flutes as the table 6 is translated. A rotary cam 269 of a suitable configuration is interchangeably mounted on the shaft 268 outside of the housing 264, and engages a cam follower or roller 270 on an oscillating lever 271. One end of the lever 271 is pivoted to the housing 264, and the other end is formed with an elongated arcuate slot 272. A generally vertical link 273 has a ball-joint connection at the upper end with a pivot 274 secured to the lever 271 for adjustment along the slot 272. The lower end of the link 273 is pivotally connected to a guide member 275 which is vertically reciprocable in a bearing bracket 276 on the table 6, and which has a roller 277 disposed in a horizontal guide channel 278. This channel is formed on the free end of an arm or bracket 279 which is fixed on a rock shaft 280 extending longitudinally of the base section 2, and which is of such width that the roller 277 will engage the channel in all positions of the table 6. The shaft 280 is journaled in suitable bearing brackets 281 on the rear of the base section 2, and at one end extends into a gear housing 282 wherein it is connected through bevel gears 283 to a transverse shaft 284. The rear end of the shaft 284 is axially splined to an elongated bushing 285 rotatable in the base slide 166. An arcuate double gear rack 286, suitably guided in the base slide 166 for movement about the axis 234, meshes at one side with a gear 287 fixed on the bushing 285, and at the other side with a gear 288 fixed on a shaft 289 journaled in the cradle 233. A substantially vertical link 290 has a universal pivotal connection at its lower end with an arm 291 on the shaft 289, and a similar connection at its upper end to one side of the oscillatory sleeve 229. The arm 291 is adjustably locked to the shaft 289, and may be located in the required position for any selected adjustment of the cradle 233. When the arm 291 is released from the shaft 289, the oscillatory sleeve 229 may be locked by a clamp screw 292 in position for dressing or cylindrical grinding. The screw 292 is adjustably threaded in the head bracket 232, and adapted to be projected into a socket 293 in one side of the sleeve 229.

It will be evident that the back-off cam 269 is operable through the mechanism just described to oscillate the grinding wheel 16 toward and from the work axis in any position of the table 6, the headstock 7 and the tool fixture 14, and in timed relation to the rotation of the work spindle 8. The character of the back-off movement is determined by the shape of the cam 269, and the extent or depth of movement may be changed by adjusting the pivot 274 in the slot 272.

When a back-off movement is not desired, the follower 270 is lifted out of engagement with the cam 269. The means for this purpose comprises a cam 294 on the underside of the rock shaft arm 279, and adapted for engagement by a roller 295 on the upper end of a lever 296 pivoted on one of the brackets 281. The lower end of the lever 296 is pivotally connected to the rear end of a pull rod 297 extending slidably through the base section 2 to the front of the machine. Journaled in a housing 298 on the front of the base section 2 in a vertical rock shaft 300 provided at the upper end with a hand lever 301 and at the lower end with a cam 302 adapted to be rotated into engagement with an antifriction abutment 303 on the front end of the pull rod 297 to effect disengagement of the cam follower 270 and the cam 269. Disconnection of the back-off drive may also be effected by releasing the arm 291 from the shaft 289.

*The dressing mechanism for external grinding*

The dressing mechanism 18 (see Figs. 2, 18 to 21) is mounted on the cross slide 166 for automatic adjustment transversely of the grinding wheel axis, and comprises a plurality of independently adjustable dressing unit 304, 305 and 306 automatically operable to true the various faces of the cutting contour of the external grinding wheel 16.

In its preferred construction, the dressing mechanism 18 comprises a base bracket 307 mounted on the top of the cross slide 166 for movement therewith. A dresser slide 308 is mounted on the bracket 307 for rectilinear feed transversely of the tool spindle 15, and is formed on the top with a plurality of arcuate guideways 309 concentric about a vertical axis 310 in the central plane of the grinding wheel 16. The dressing units 304, 305 and 306 are mounted in the guideways 309 for selective adjustment into different angular positions relative to the grinding wheel 16 depending on the form and character of the thread to be ground and hence the contour of the wheel. It will be understood that the dressing units may be arranged for various thread forms, such as U. S. standard, sharp V, Acme and modified Buttress. In the persent instance, the dressing units are shown arranged respectively to true the faces of a wheel contour having oppositely inclined side faces 311 and 312 and a peripheral face 313.

Preferably, the dressing units 304, 305 and 306 are closely similar in construction so that a description of the unit 306 will suffice for all. This unit comprises a body bracket 314 having an arcuate guideway 315 slidable on one of the guides 309. A gear pinion 316 is journaled in the outer end of the bracket 314, and meshes with a gear segment 317 on the slide 308 and concentric with the guide 309. Two screws 318 are threaded through opposite ends of an arm 319, rigid intermediate its ends with the pinion 316, for engagement with the bracket 314. The pinion 316 is adapted to be lifted out of engagement with the segment 317 to permit free movement of the bracket 314 along the guide 309 for rough adjustment. Fine adjustment is obtained by turning the screws 318 oppositely to rotate the pinion 316 while in mesh with the segment 317. A suitable arcuate scale 320 is provided on the slide 308 to indicate the position of adjustment.

The body bracket 314 is adapted to be locked in position of adjustment by a gib block 321 which is disposed in a recess 322 in the guideway 315 for clamping engagement with the guide 309, and which is threaded on a screw 323 journaled in and extending to the front of the bracket 314 and there provided with a hand knob 324.

Fixed on the bracket 314 is a cylinder 325 which is closed at one end by a plate 326 and has an elongated bearing sleeve 327 at the other end. A piston 328 is reciprocable in the cylinder 325 and is nonrotatably fixed on a rod 329 extending slidably through the sleeve 327. A pin 328a fixed in the bracket 314 has a close sliding fit with the piston 328 to hold the latter against rotation in the cylinder 325. The outer end of the rod 329 is provided with a head 332 in which a suitable dressing tool 333 is secured for radial adjustment. Fluid under pressure is adapted to be supplied alternately from lines 330 and 331 opening to opposite ends of the cylinder 325 to reciprocate the piston 328 and thereby move the tool 333 in a dressing cut across the intended face of the grinding wheel 16.

The dresser slide 308 may be fed either manually, or automatically by hydraulic means once for each reciprocation of the work table 6. The feed means (see Figs. 2, 20 and 21) comprises a screw 334 rotatably anchored against endwise movement in antifriction bearings 335 in the base bracket 307, and extending in threaded engagement with a fixed nut 336 on the underside of the slide 308. A worm wheel 337 is fixed on the screw 334 and meshes with a worm 338 on a transverse shaft 339 supported in antifriction bearings 340 in the side of the bracket 307. The outer end of the shaft 339 extends through a housing 341, and is provided with a hand wheel 342. A rachet wheel 343 is fixed on the shaft 339 within the housing 341, and is adapted for engagement by a pawl 344 pivotal on the upper end of a vertical lever 345. The lower end of the lever 345 is rigid with a gear segment 346 which is freely rotatable on the shaft 339, and which meshes with a longitudinal gear rack 347 on a piston rod 348. The rod 348 is connected to a piston 349 reciprocable in a cylinder 350 mounted within the bracket 307. Fluid pressure is adapted to be supplied alternately through lines 351 and 352 to opposite ends of the cylinder 350 to effect reciprocation of the pawl 344. The length of the automatic stroke of the pawl 344 and hence the dresser feed increment is subject to adjustment by means of a stop screw 353 which is adjustably threaded through one wall of the bracket 307 and limits the outward movement of the piston rod 348.

A hand lever 354 is journaled in one wall of the bracket 307, and has an arm 355 adapted for engagement with a pin 356 on the pawl 344 to lift the latter out of engagement with the ratchet wheel 343 when it is desired to feed the slide 308 manually, for example, to retract the slide for the purpose of mounting a new grinding wheel 16.

For each dressing feed increment, a like approach feed increment is imparted to the tool cross slide 166 to compensate for the reduced diameter of the grinding wheel 16. To this end, the worm 176 (see Fig. 10) is connected to an automatic feeding mechanism having an actuating piston 357 (see Fig. 27) in a cylinder 358 connected across the lines 351 and 352 and operable simultaneously with the piston 349. This feeding mechanism is like that shown in Figs. 20 and 21, and hence is not separately shown in detail.

*Internal grinding*

The machine may be adapted for internal grinding by the substitution of a suitable spindle structure (see Figs. 22 and 26). This structure comprises a split bracket 360 removably mounted on the machined front face of the cradle 233, and supporting a tool spindle 361. One end of the spindle 361 projects laterally from the bracket 360, and supports an internal grinding wheel 362. When internal backing-off is desired, the spindle 361 may be supported in an oscillatory sleeve (not shown) mounted in the bracket 360 and operable in the same manner as the sleeve 229 (shown in Fig. 16).

The spindle 361 is adapted to be driven from the motor 259. Thus, a pulley 363, fixed on the spindle 361, is connected through a belt 364 to a step pulley 365 mounted for adjustment along a short horizontal slot (not shown) in the side of the cradle 233. The pulley 365 is connected through a belt 366 to the motor step pulley 258. The step pulleys 258 and 365 permit two speed changes. The belt 366 may be tensioned or tightened by adjusting the position of the pulley 365, while the belt 363 is suitably tensioned by an idler pulley 367.

*The dressing mechanism for internal grinding*

The dressing mechanism for the internal grinding wheel 362 (see Figs. 22 to 25) is adapted to be mounted on the headstock 7 in place of the tailstock 9. It comprises a base slide 368 mounted on the ways 11 for adjustment longitudinally of the headstock 7, and adapted to be secured in position of adjustment by a clamp screw 369. The base slide 368 is formed on the top with transverse ways 370 supporting an adjusting slide 371 for movement toward and from the grinding wheel 362. An adjusting screw 372, provided with a graduated hand knob 373, is rotatably anchored in a depending lug 374 on the front end of the slide 371, and is in threaded engagement with a fixed nut 375 on the slide 368.

Mounted on ways 376 on the slide 371 for quick adjustment into and out of dressing position is a retracting slide 377 supporting a hand dresser 378. The slide 377 is formed with an elongated longitudinal slot 379. A clamp bolt 380, with a hand lever 381, extends through the slot 379 and into threaded engagement with the slide 371, and is adapted to lock the slide 377 in position of adjustment. A pin 382 extends through the slide 377 into the outer end of the slot 379, and is adapted for engagement with the bolt 380 to locate the dresser 378 in operative position. Accurate dressing adjustment is obtained by means of the fine screw 372 while the pin 382 is against the stud 380. Thereafter, the dresser 378 may be retracted to clear the bracket 360 by simply loosening the bolt 380 and moving the slide 371 forwardly as permitted by the slot 379, and may be quickly returned into operative position, as determined by engagement of the pin 382 with the bolt, without requiring adjustment of the screw 372.

The dresser 378 comprises a swivel plate 383 which is mounted in a bore 384 opening through the rear end of the slide 377 for rotary adjustment about a vertical axis. The plate 383 has a graduated flange 385 overlying the slide 377 and a hand lever 386 for facilitating adjustment. A stud 387 extends through the swivel plate 383 and has a locking flange 388 underlying the slide 377. A knurled knob 389 is threaded onto the upper end of the stud 387, and when tightened serves to secure the plate 383 in position of adjustment.

The plate 383 is formed with a depending eccentric bracket 390. Mounted in antifriction bearings 391 in the lower end of the bracket 390 is a pivot shaft 392 supporting a generally vertical lever 393. This lever projects upwardly through a slot 394 in the plate 383, and at the lower end supports an adjustable dressing tool 395.

The swivel plate 383 is adjustable through 180 degrees to permit location of the tool 395 in different selective dressing positions. Suitable accurately adjustable stops 396 are provided for locating the tool 395 quickly in position for dressing the oppositely inclined faces of the grinding wheel 362. These stops comprise two fine thread parallel screws which are threaded into opposite sides of the bore 384, and project tangentially into an annular groove 397 in the swivel plate 383 for engagement respectively with limit pins 398. Each of the pins 398 is threaded vertically through the groove 397 into a tapered seat 399 which eliminates any error due to clearance. To dress the root cutting face of the wheel 362, the swivel plate 383 is adjusted into intermediate position with the aid of the graduated flange 385.

The dressing attachment is approximately aligned with the grinding wheel 362 by movement of the table automatically into stop position. The final precise adjustment is then made by rotating the worm shaft 47 to move the table in accordance with an indicator 400. This indicator is mounted on the base section 2, and is adapted for engagement by a contact screw 401 adjustably mounted in a bracket 402 on the table 6. The worm shaft 47 is adapted to be adjusted by an aligned shaft 402a extending slidably and rotatably through the cover 28 of the headstock 7, and having a squared end for engagement by a suitable hand tool (not shown). A coupling member 402b on the inner end of the shaft 402a is adapted to be moved into engagement with a complementary coupling member 402c rigid with the pulley 45, and is normally retracted out of engagement by means of a spring 402d.

*Hydraulic operating system*

The machine comprises a hydraulic operating system (see Figs. 27 and 28) including the hydraulic rotary motor 43 for driving the work spindle 8, the work carriage 6 and the back-off cam 269, and also including the various cylinder and piston motors for operating the sine bar follower 76 and the backlash compensating devices, and for driving the cross feed, the dressing feed and dressing units 304, 305 and 306, and the supplemental cross feed compensating for the dressing feed.

Fluid under pressure is adapted to be supplied by a variable delivery pump 403 having a discharge line 404 and an intake line 405 opening from a sump 406 within the base 1. The pump 403 may be of any suitable character, and preferably is of the orifice pressure controlled type disclosed in my copending application Serial No. 147,178, filed June 9, 1937. More particularly, the pump 403 has a control line 407 which, as hereinafter described, is adapted to be connected by a valve 408 either to the exhaust side of the hydraulic system for utilization of a pressure built up by a flow restriction to cause the delivery of fluid in variable amounts as required and at a predetermined substantially constant pressure without the use of relief valves, or to the pressure discharge line 404 to substantially stop fluid delivery except as required to maintain said pressure. The pump 403 may be driven by any suitable means, such as an electric motor 410 connected thereto through a drive coupling 409, and controlled by start and stop buttons 411 and a master stop button 412 for the entire machine on the front of the machine base 1. To prevent the transmission of vibration, the pump 403 and the motor 410 are mounted on a base 413 resiliently supported as by rubber on the floor adjacent the base 1. The drive assembly is enclosed by a louver ventilated guard 414.

The pressure line 404 opens to a main hydraulic control panel 416 on the front of the base section 2. The hydraulic panel is sectionally constructed of castings and grooved plates housing the various control valves and defining the connecting passages in a compact arrangement.

A suitable direction and stop valve 417 is operable to connect the pressure line 404 selectively to either of the lines 57 and 58 leading to the motor 43 for driving the table 6, the work spindle 8 and the back-off cam 269, and simultaneously to connect the other of said motor lines to an exhaust line 418 discharging to the sump 406.

In its preferred form, the valve 417 comprises a tubular bushing 419 fixed in a bore 420 in the panel 416, and having formed therein in longitudinally spaced relation two pressure ports 421 and 422 of which the port 421 is connected to the line 404, two motor supply ports 423 and 424 between the pressure ports and connected respectively to the lines 57 and 58, and a central exhaust port 425 between the supply ports and connected to the exhaust line 418. A valve piston 426 of the spool type is reciprocable in the bushing 419, and is formed with three longitudinally spaced peripheral grooves or recesses 427, 428 and 429. The central recess 428 is always open to the exhaust port 425, and the end recesses 427 and 429 are interconnected through an axial bore 430 in the piston 426 and are always open to the pressure ports 421 and 422. It will be evident that in one end position of the valve piston 426, the lines 57 and 58 will be connected respectively to the pressure and exhaust lines 404 and 418 to operate the motor 43 in one direction, and in the other end position, the connections will be reversed to operate the motor in the opposite direction. In the central or neutral position, both lines 57 and 58 will be disconnected from the pressure line 404 and connected to the exhaust line 418.

Suitable flow restriction means is interposed in the exhaust line 418 to control the rate of drive by the motor 43 in either direction. In the present instance, this means consists of three adjustable restriction orifice valves 431, 432 and 433 located respectively in three parallel branch lines 434, 435 and 436, and adapted for selective connection in the exhaust line 418 by a three position valve 437. These orifice valves are independently adjustable from the front of the panel 416. In the present instance, the orifice valve 432 in the intermediate branch line 435 is adjusted to provide a relatively large flow area adapted to effect a rapid traverse, and the other orifice valves 431 and 433 are adjusted to provide relatively small flow areas adapted to effect slow drive speeds or feeds.

The orifice selection valve 437 comprises a bushing sleeve 438 fixed in a bore 439 in the panel 415. Four longitudinally spaced ports 440, 441, 442 and 443 are formed in the sleeve 438 and open respectively to the lines 434, 435, 436 and 418. A valve piston 444 is reciprocable in the sleeve 438, and is formed with two longitudinally spaced sets of ports 445 and 446 interconnected by an axial bore 447. The arrangement is such that the ports 441 and 446 are connected to institute rapid traverse when the piston 444 is in central position, the ports 440 and 445 are connected to institute a slow feed when the piston is in one end position, and the ports 442 and 446 are connected to institute a second slow feed when the piston is in the other end position.

The operation of the valves 417 and 437 is under the control of a plurality of pilot valves consisting of a start and stop valve 448, direction control valves 449 and 450, and speed control valves 451 and 452. These pilot valves are located in a panel 415, and are included in pilot control circuits under a relatively low operating pressure.

Fluid is supplied from the main pressure line 404 to a pilot pressure line 453 under the control of an automatic regulating valve 454. This valve comprises a bore 455 opening centrally to a high pressure chamber 456 connected to the line 404, and at opposite ends respectively to a low pressure chamber 457 connected to the line 453 and an exhaust chamber 458 connected to an auxiliary exhaust line 459 leading to the sump 406. A plunger 460 extends slidably through the bore 455, and is urged endwise against the pressure in the chamber 457 by a compression spring 461 seated against an adjusting screw 462 in the exhaust chamber 458. The plunger 460 is formed with a longitudinal bore 463 open to the low pressure chamber 457, and adapted for communication with the chamber 456 or the chamber 458. When the pressure in the chamber 457 is too low, replenishing fluid will be supplied from the chamber 456 through the bore 463. When the pressure is at the desired value determined by the spring 461, the bore 463 will be closed to cut off the flow of fluid. In the event of high pressure leakage, the resulting excess pressure will be by-passed to the exhaust chamber 458. As a result, a balanced relatively low constant pressure is substantially maintained in the line 453 at all times.

The direction valve 417 is movable into stop position by two centering plungers or collars 464 which are freely reciprocable in cylinders 465 at opposite ends of the bore 420 for engagement with opposite ends of the valve piston 426. The outer ends of the cylinders 465 are open to a line 466 adapted for connection by the pilot valve 448 either to the pressure line 453 or the exhaust line 459.

The start and stop pilot valve 448 comprises a valve bore 467 formed in and opening to the top of the panel 415. A differential valve plunger 468 is reciprocable in the bore 467, and has an actuating stem 469 projecting outwardly for engagement by a stop dog 470 adjustably mounted on the table 6. The bore 467 has suitable port connections with the lines 459 and 466, and is always open at the small end of the plunger 469 to the pressure line 453. The bore 467 is also open at the large end of the plunger 469 to a line 471 adapted to be connected by a hand valve 472 either to the pressure line 453 or the exhaust line 459. The hand valve 472 comprises a differential cylinder 473 connected at the large and small ends respectively to the lines 466 and 459, and having suitable port connections in one side with the lines 453 and 471. A differential valve piston 474 is reciprocable in the cylinder 473 by a hand lever 475.

To institute operation, the valve piston 474 is moved into position to connect the lines 453 and 471. Thereupon, the valve plunger 468 is elevated by differential pressure, and connects the lines 459 and 466 to release the direction valve 417 for adjustment into either end position. Upon lowering the plunger 468 either by the dog 470 or through actuation of the hand valve 472 to exhaust the line 471, pressure fluid is supplied to the line 466 to center the direction valve 417 and to move or hold the hand valve 472 in stop position.

The direction valve 417 is reversible by two pins or plungers 476 adapted to act against the opposite ends of the valve piston 426. One of the reversing plungers 476 is reciprocable in a cylinder 477 connected to a fluid supply line 478, and extends axially through the adjacent centering collar 464. The other plunger 476 is reciprocable in a cylinder 479 formed in the other centering collar 464, and connected through a peripheral port 480 in the latter to a fluid supply line 481. The lines 478 and 481 are adapted to be connected through a rotary hand valve 482 to two lines 483 and 484 controlled by the direction pilot valves 449 and 450. The valve 482 is adjustable to reverse these connections for the grinding of left hand threads so that the spindle drive will properly conform to the lead screw rotation as controlled by the change gearing 85.

The pilot valves 449 and 450 respectively comprise two vertical bores 485 and 486 formed in and opening to the top of the panel 415, and two spool valve plungers 487 and 488 reciprocable therein and having axial stems 489 and 490 projecting therefrom for selective engagement by dogs 491 and 492 adjustably mounted on the table 6. The pressure line 453 opens to the upper ends of the bores 485 and 486, and the pressure fluid therefrom acts against the relatively small upper piston areas of the plungers 487 and 488. The bores 485 and 486 also have port connections with the exhaust line 459 and respectively with the lines 484 and 483. The latter also open respectively to the lower ends of the bores 485 and 486 to provide cross connections so that the pilot valves 449 and 450 will reset each other alternately in operative position for respective coaction with the dogs 491 and 492.

The port connections are such that when the plunger 489 is depressed, the cross line 484 will be connected to the pressure line 453, thereby causing upward movement of the plunger 490 to connect the other cross line 483 to the exhaust line 459. As a result, the plunger 489 is locked in depressed position, the plunger 490 is held in elevated position, and one directional pin 476 is actuated to move the direction valve 417 into position to institute carriage movement to the left. Conversely, when the plunger 490 is depressed, the lines 483 and 484 are connected respectively to the pressure and exhaust lines 453 and 459 to reverse the valve 417 and institute carriage movement to the right. Adjustment of the hand valve 482 for grinding left hand threads will reverse the motor 43 and hence the rotation of the work spindle 8 in relation to the pilot valve control, but the directional control of the table 6 is left unchanged by suitable changes in the gearing 85 in the lead screw drive.

The direction pilot valves 449 and 450 may be reversed at any time independently of the dogs 491 and 492 by means of a hand valve 493. To this end, two lifting pistons 494 and 495 are mounted in cylinders 496 and 497 at the lower ends of the bores 485 and 486, and normally constitute stops for the plungers 487 and 488. However, either of these pistons 496 and 497 may be actuated hydraulically to elevate the associated pilot plunger into operative position. The hand valve 493 comprises a bore 498 having port connections with the pressure and exhaust lines 453 and 459 and with two lines 499 and 500 opening respectively to the lower ends of the lifting cylinders 496 and 497. A valve piston 501 of the spool type is normally held by spring means 502 in central position to connect both of the lines 499 and 500 to the exhaust line 459. Movement of the valve piston 501 into opposite end positions serves to connect the lines 499 and 500 respectively and reversibly to the lines 483 and 459 to supply pressure fluid selectively to one or the other of the cylinders 496 and 497.

The orifice selection valve 437 is controlled by the rapid traverse pilot valve 452 and the feed pilot valve 451 in conjunction with the direction pilot valves 449 and 450.

Two centering collars or pistons 503 and 504 are reciprocable in cylinders 505 and 506 at opposite ends of the bore 439 for engagement simultaneously with opposite ends of the valve piston 444. The outer ends of the cylinders 505 and 506 are open in parallel to a line 507 adapted for connection by the rapid traverse valve 452 either to the pressure line 453 or the exhaust line 459. The valve 452 in turn is controlled by the feed valve 451. These valves 451 and 452 respectively comprise vertical bores 508 and 509 formed in and opening to the top of the panel 415, and spool type valve plungers 510 and 511 reciprocable therein and having stems 512 and 513 projecting therefrom for selective actuation by dogs 514 and 515 adjustably mounted on the table 6. Both bores 508 and 509 are open at the upper end above the small piston areas of the plungers 510 and 511 to the pressure line 453 and have port connections with the exhaust line 459. The bore 509 also has a port connection with the line 507 which has a cross connection with the lower end of the bore 508 below the large piston area of the plunger 510. Likewise the bore 508 has a port connection with a cross line 514 opening to the lower end of the bore 509 below the large piston area of the plunger 511.

The port connections are such that when the plunger 511 is depressed pressure fluid is supplied from the line 453 to the line 507 to elevate the plunger 510 and center the valve 437. At the same time, the plunger 510 connects the cross line 514 to the exhaust line 459 to lock the valve 513 in its lower position. Fluid from the motor 43 is now exhausted through the rapid traverse orifice 432. When the feed plunger 510 is depressed, pressure fluid is supplied from the line 453 to the cross line 514 to elevate the plunger 511 which thereupon connects the line 507 to the exhaust line 459 to relieve the cylinders 505 and 506 and the lower end of the bore 508.

When the feed plunger 510 is depressed, the valve 437 is selectively adjustable automatically into opposite end positions as determined by the direction of carriage travel under the control of the direction pilot valves 449 and 450. Thus, two adjusting pistons 515 and 516 are reciprocable in cylinders 517 and 518 at opposite ends of the valve bore 439 and extend slidably through the centering pistons 503 and 504 for engagement respectively with opposite ends of the valve piston 444. The outer ends of the cylinders 517 and 518 are connected respectively to the lines 483 and 484. It will be evident that when the plunger 488 is depressed to institute carriage movement to the right, pressure fluid is supplied to the cylinder 517 to connect the feed orifice 433 in the exhaust line 459. Alternatively, when the plunger 487 is depressed to institute carriage movement to the left, the feed orifice 431 is connected in the exhaust line 459. The orifice valves 431 and 433 may be relatively adjusted to obtain the same or different rates of drive in opposite directions of carriage travel.

The table dogs (see Fig. 29) may be selected and mounted to obtain different cycles of operation. The position of the reversing dogs 491 and 492 determines the location and extent of the range of table reciprocation. The stop dog 470 is of the pivotal gravity type and adapted to depress the stem 469 only upon movement of the table 6 in one direction. To stop the table in the opposite direction, it is merely necessary to reverse the dog 470 on the pivotal mounting. After depressing the stem 469, the dog 470 will swing past the latter to permit institution of the next cycle. In the arrangement as shown, if the direction dog 491 is adapted to engage the stem 489 before the dog 470 can engage the stem 469, the table reciprocation will be continuous. Conversely, if the dog 470 is adapted to engage the stem 469 before the direction dog 491 can engage the stem 489, the table 6 will come to a stop at the end of the right-hand movement.

Each of the speed control dogs 514 and 515 is also operable only upon movement of the table in one direction. As shown, the feed dog 514 is freely pivotal to the left and is, therefore, adapted to drag freely over the stem 512 upon movement of the table to the right and to depress the stem only upon movement to the left. To institute feed during table movement to the right, it is merely necessary to reverse the dog 514 on the pivotal mounting. The rapid traverse dog 515 is adapted to depress the stem 513 upon movement of the table to the right but is ineffective in the opposite direction of movement. It will be understood that any desired number of dogs 514 and 515 effective in either direction may be provided depending on the particular series of rapid traverse and feed movements to be obtained.

The pump control valve 408 is operable synchronously with the direction valve 417 under the control of the start and stop pilot valve 448. This valve 408 comprises a bore 519 open at one end to the adjacent cylinder 465 and at the other end to the exhaust line 459, and having port connections with the pressure line 453, the pump control line 407 and a line 520 branching from the exhaust line 418 ahead of the orifice selection valve 437. A differential valve piston assembly 521 is reciprocable in the bore 519. When pressure fluid is supplied to the cylinders 465 to center the valve 417 in stop position, it also acts on the large piston area of the assembly 521 to connect the motor control line 407 to the high pressure line 404 and thereby reduces the delivery of the pump to maintain a low pilot pressure in the system. When the adjacent cylinder 465 is exhausted, pressure fluid from the line 453 acts on the small piston area of the plunger 521 to connect the control line 407 to the orifice pressure line 520. The pressure set up in the exhaust line 418 by the selected orifice valve now controls the pump 403 to obtain a variable delivery as required at a constant predetermined pressure.

It will be seen that the main valves 417 and 437 and the various pilot valves 448, 49, 450, 451 and 452 are controlled and operated by the relatively low pilot pressure. As a result, the relatively high pump pressure can be confined to one valve block, and the remaining valve ports can be made relatively light without the likelihood of leakage.

Various auxiliary elements of the machine are operated by auxiliary circuits including a relatively low pressure line 522 adapted to receive pressure fluid from the main pressure line 404 under the control of an automatic regulating valve 523. This valve 523 comprises a bore 524 opening from the chamber 456 at opposite ends to the exhaust chamber 458 and a chamber 525 connected to the line 522. A plunger 526 is reciprocable in the bore 524 and is urged against the pressure in the chamber by a compression spring 527 seated against an adjusting screw 528. The plunger has an axial bore 529 open to the chamber 525 and adapted for communication with the chamber 456 to supply pressure fluid up to a predetermined low pressure or for communication with the chamber 458 to relieve excess pressure fluid to the exhaust. The valve 523 operates in the same manner as the valve 454 to maintain a constant relatively low pressure in the line 522.

The line 522 is connected directly through the branch line 149 to the cylinder 148 for maintaining pressure engagement between the sine bar 146 and the follower 143 at all times.

The backlash cylinder 100 for the table feed screw 77, and the cross feed cylinder 207 for the slide 166, are connected in parallel by the lines 102 and 103 and the lines 208 and 209, and are adapted to be reversibly connected by a valve 533 to the pressure and exhaust lines 522 and 459. The valve 533 is automatically reversible with the direction valve 417 under the control of the pilot valves 449 and 450 so that the backlash will be taken up in a direction corresponding to the table movement and a feed increment will be imparted to the slide 166 once for each reversal of the table 6. Thus, the valve 533 comprises a bore 534 open at opposite ends to the lines 483 and 484, and a spool type valve piston 535 reciprocable therein. In one position of the piston 535, the line 102 is connected to the pressure line 522, and the line 103 is connected to the exhaust line 459, and in the other position, the connections are reversed.

The lines 181 and 182 leading to the backlash cylinder 177 for the cross feed screw 167 are adapted to be reversibly connected by a hand valve 537 to the pressure and exhaust lines 522 and 459. The connections are reversed by the valve 537 for cross feeds in opposite directions, as for internal and external grinding.

The dresser feed cylinder 350 and the compensatory cross feed cylinder 358 are connected in parallel to the lines 351 and 352 which are adapted to be reversibly connected, respectively for internal and external grinding, through a hand valve 538 directly to the pressure and exhaust lines 522 and 459. When not in use, the valve 538 is held in position by an internal spring (not shown).

The three cylinders 325 for the dressing units 304, 305 and 306 (see Figs. 18, 27 and 28) are connected in series for successive operation to the lines 330 and 331. More particularly, the line 330 opens to one end of the first cylinder 325. A line 540 adapted to be opened by the associated piston 328 when the latter reaches the end of its stroke in one direction is connected through a by-pass check valve 541 to the line 330 and opens to the inner end of the second cylinder 325. Another line 542 adapted to be opened by the associated piston 328 when the latter reaches the outer end of its stroke is connected through a by-pass check valve 543 to the line 540 and opens to the outer end of the third cylinder 325. Similarly, the line 331 opens to the inner end of the third cylinder 325. A line 544 adapted to be opened by the third piston 328 when the latter reaches its outermost position is connected through a by-pass check valve 545 to the line 331 and opens to the outer end of the second cylinder 325. A line 546 adapted to be opened by the second piston 328 when the latter reaches its innermost position is connected through a bypass check valve 547 to the line 544 and opens to the outer end of the first cylinder 325. All of the cylinder lines open to the cylinders at the top so as to permit removal of air. It will be evident that when pressure fluid is supplied to the line 330, the first tool 333 will dress one inclined face 311, then the second tool 333 will dress the peripheral face 313, and finally the third tool 333 will dress the other inclined face 312. The fluid from the other ends of the cylinders will exhaust freely through the line 546, the check valve 547, the line 544 and the check valve 545 to the line 331. When pressure fluid is supplied to the line 331, the sequence is reversed, with the tools 333 moving in the opposite directions. By reason of the aforesaid arrangement of check valves, accumulating air is removed without the loss of liquid fluid.

The two lines 330 and 331 are adapted to be reversibly connected by a hand valve 548 at the rear of the machine to two lines 549 and 550, and the latter are adapted to be reversibly connected by a hand valve 551 in the front panel 416 to the pressure and exhaust lines 453 and 459.

The hand valve 548, which is used while setting the dressing mechanism 18 to a new grinding wheel 16, is normally urged into one position by spring means (not shown) to maintain the tools when not in use away from the wheel. Similarly, the valve 551 is normally held in one position by pressure fluid from the line 453.

An adjustable orifice valve 552 is interposed in the exhaust line 459 at the outlet side of the valve 551 to meter the fluid discharged from the dressing mechanism 18.

*Operation*

The operation of the machine will be apparent from the foregoing description, and briefly summarized is as follows:

The work to be ground is attached to the work spindle 8. Then, the valve 537 is adjusted to obtain the desired direction of spindle rotation, and suitable change gears 85 are used to correlate the translation of the table 6 both in rate and direction to the spindle rotation so as to describe the desired thread lead. The headstock 7 and the sine bar 146 may be adjusted by means of the knobs 54 and 160 as required for straight or taper grinding. For straight grinding, the spindle 8 and the bar 146 are located to extend parallel to the table movement, and hence the nut 76 is held against rotation. On occasion, the bar 146 may be inclined to modify the lead angle provided by the change gears 85. For taper grinding, the spindle 8 and the bar 146 are inclined, and the latter acts to rotate the nut 76 in timed relation to the table movement so as to compensate the lead angle for the error that would otherwise result by reason of the inclination of the work relative to the grinding wheel.

The cradle 233 is adjusted by the hand wheel 248 to incline the grinding wheel 16 in accordance with the lead angle of the thread to be cut.

The grinding wheel 16 for external grinding is suitably contoured by the dressing mechanism 18 to cut the desired thread form, for example, U. S. standard, sharp V, Acme or Buttress. The dressing mechanism 18 may be advanced into operative relation to the wheel 16 by repeatedly reversing the hand valve 538. Operation of the dressing units 304, 305 and 306 is effected by the hand valve 551 at the front of the machine or the hand valve 548 at the rear of the machine, and the rate of dressing tool movement is under the control of the adjustable orifice 552. For internal grinding, the wheel 362 is contoured by the dressing device 378 (see Fig. 25).

The cross slide 166 is now adjusted by means of the hand wheel 192 to position the grinding wheel 16 in operative relation to the work, and then the gauge rod 219 is finely adjusted by means of the nut 226 to a predetermined setting of the gauge 216, and clamped to the slide by means of the clutch actuating screw 224. The gauge 216 facilitates accurate relocation of the slide 166 in the initial position for successive operations.

When changing from internal to external grinding and vice versa, the hand valve 537 is reversed to take up backlash in the cross feed drive in the proper direction.

The switches 250 and 411 are actuated to start the motors 259 and 410, and the lever 475 is actuated to institute operation of the table 6 and the spindle 8. The table 6 will now be translated automatically through a predetermined cycle which may comprise any desired program of rapid traverse and feed movements. At any point in the cycle, the direction may be reversed by actuating the hand valve 493. The rapid traverse rate is determined by the exhaust orifice 432, and the feed rates in opposite directions are controlled respectively by the orifices 431 and 433. These orifices are independently adjustable. The reciprocation of the table 6 may be continuous or interrupted depending on the location of the stop dog 470. The operation may be discontinued at any time by actuating the hand lever 475.

At each reversal of the table 6, a feed increment is automatically imparted to the slide 166 until the wheel 16 is fed to the desired cutting depth.

If a fluted work piece is to be relief ground, the lever 301 is actuated to render the back-off mechanism operable. This mechanism serves to reciprocate the grinding wheel 16 toward and from the work in timed relation to the rotation of the spindle 8.

For redressing the wheel 16 to compensate for wear or to redefine the cutting contour, the valve 538 is actuated to advance the dressing mechanism 18 to the desired extent toward the wheel, and then the dressing units 304, 305 and 306 are actuated as before. An equal feed is simultaneously imparted to the slide 166 to compensate for the reduced diameter of the wheel 16, and thereby maintain the initial gauge setting.

Location of the work axially relative to the wheel 16 is determined by the setting of the control dogs. Where accurate relocation of a ground thread is desired, the table 6 may be adjusted relatively to the lead screw 77 by means of the hand knob 140. It will be understood that location between the wheel 16 and the work is not affected by backlash in the table drive since any existing backlash is automatically compensated for by the device 99 in each direction of translation.

The dressing mechanisms shown and described herein are disclosed and claimed in my copending divisional application Serial No. 350,362, filed August 3, 1940, and entitled "Dressing mechanism for grinding wheels."

The fluid pressure or hydraulic operating system shown and described herein is disclosed and claimed in my copending divisional application Serial No. 351,040, filed August 3, 1940, and entitled "Hydraulic transmission for machine tools."

I claim as my invention:

1. A thread grinding machine comprising, in combination, a base, a table reciprocable on said base, a headstock angularly adjustable on said table and having a work spindle, a hydraulic motor for rotating said spindle and reciprocating said table in timed relation, means selectively available to modify the drive for said table to compensate for angular adjustment of said headstock, a cross-feed slide mounted on said base for movement transversely of said table, means for automatically imparting an approach feed increment once for each reversal of said table, a grinding wheel spindle mounted on said slide for angular adjustment in accordance with different thread leads and for back-off reciprocation toward and from said work spindle, and means operable in timed relation to said work spindle for imparting said back-off reciprocation to said wheel spindle.

2. A thread grinding machine comprising, in combination, a base, a table reciprocable on said base, a headstock on said table and having a work spindle, a hydraulic motor for rotating said spindle and reciprocating said table in timed relation, a cross-feed slide mounted on said base for movement transversely of said table, means for automatically imparting an approach feed increment once for each reciprocation of said table, a grinding wheel spindle mounted on said slide for angular adjustment in accordance with different thread leads and for back-off reciprocation toward and from said work spindle, and means operable in timed relation to the rotation of said work spindle for imparting said back-off reciprocation to said tool spindle in any position of reciprocation of said table and any position of feed adjustment of said slide and any angular position of lead adjustment of said wheel spindle.

3. A thread grinding machine comprising, in combination, a base, a table reciprocable on said base, a headstock angularly adjustable on said table and having a work spindle, a hydraulic motor for rotating said spindle and reciprocating said table in timed relation, means selectively available to modify the drive for said table to compensate for angular adjustment of said headstock, a cross-feed slide mounted on said base for movement transversely of said table, means for automatically imparting an approach feed increment once for each reversal of said table, and a grinding wheel spindle mounted on said slide for angular adjustment in accordance with different thread leads.

4. A machine tool comprising, in combination, a base, a table reciprocable on said base, a cross slide movable on said base, a headstock mounted for angular adjustment on said table and having a power operated work spindle, change-speed gearing mounted on said headstock and driven by said spindle, a back-off cam rotatable by said gearing, a slotted lever pivoted on said headstock and having a follower engaging said cam, a rock shaft journaled on said base and extending longitudinally of said table, a crank arm on said shaft and providing an elongated guideway along said shaft, a rod mounted on said table for reciprocation transversely of said shaft and having a follower engaging in said guideway, an actuating link having a universal pivot connection with said rod and an adjustable universal pivot connection with the slotted portion of said lever, a tool spindle mounted on said cross slide for a relieving reciprocation toward and from said work spindle, and means operable by said rock shaft for effecting said relieving reciprocation.

5. A machine tool comprising, in combination, a base, a table reciprocable on said base, a cross slide movable on said base, a headstock mounted on said table and having a power operated work spindle, a back-off cam operable by said spindle, a lever pivoted on said headstock and having a follower engaging said cam, a rock shaft journaled on said base and extending longitudinally of said table, a crank arm on said shaft and providing an elongated guideway along said shaft, a rod mounted on said table for reciprocation transversely of said shaft and having a follower engaging in said guideway, an actuating link having a pivot connection with said rod and a pivot connection with said lever, a tool spindle mounted on said cross slide for a relieving reciprocation toward and from said work spindle, and means operable by said rock shaft for effecting said relieving reciprocation.

6. A machine tool comprising, in combination, a base, a table reciprocable on said base, a cross slide movable on said base, a headstock mounted on said table and having a power operated work spindle, a back-off cam on said table and operable by said spindle, a rock shaft on said base and extending longitudinally of said table, means splined to said rock shaft and operable by said cam for oscillating said rock shaft in timed relation to the rotation of said spindle in any position of translation of said table, a tool spindle mounted on said cross slide, means for effecting a relieving reciprocation of said tool spindle on said cross slide toward and from said work spindle, and means operable by said rock shaft for actuating said last mentioned means to effect said relieving reciprocation in any position of adjustment of said cross slide.

7. In a machine tool, in combination, a base, a table reciprocable on said base, a lead screw rotatably mounted on said table for endwise movement therewith, a nut in threaded engagement with said screw and supported on said base for rotary threaded adjustment, an elongated sine bar pivotally mounted intermediate its ends on said table and having a contact face extending generally longitudinally thereof, two transverse pins extending slidably in said table for engagement with opposite end portions of said bar, an adjusting bar slidably mounted in said table and having oppositely inclined wedge faces respectively engaging said pins, rack and pinion means for actuating said adjusting bar to move said sine bar into different selective angular positions, means for locking said adjusting bar in position, means for indicating the position of said adjusting bar, a lever rigid with said nut and having a floating follower on one end slidably engaging said contact face, and hydraulic means coacting with the other end of said lever to hold said follower against said contact face.

8. In a machine tool, in combination, a base, a table reciprocable on said base, a lead screw rotatably mounted on said table for endwise movement therewith, a nut in threaded engagement with said screw and supported on said base for rotary adjustment, a sine bar pivotally mounted on said table and having a contact face extending generally longitudinally thereof, two transverse pins extending slidably in said table for end engagement with said bar to limit movement thereof respectively in opposite directions, an adjusting bar slidably mounted in said table and having oppositely inclined wedge faces respectively engaging the ends of said pins, means for shifting said adjusting bar to locate said sine bar into different selective angular positions, a lever rigid with said nut and having a follower slidably engaging said contact face, and hydraulic means coacting with said lever to hold said follower against said contact face.

9. In a machine tool, in combination, a base, a table reciprocable on said base, a lead screw rotatably mounted on said table for endwise movement therewith, a nut in threaded engagement with said screw and supported on said base for rotary adjustment, a sine bar mounted for angular adjustment on said table and having a contact face extending generally longitudinally thereof, means for adjusting said sine bar into different selective angular position, a lever rigid with said nut and having a follower slidably engaging said contact face, and means coacting with said lever to hold said follower against said contact face.

10. In a machine tool, in combination, a base, a table reciprocable on said base, a lead screw rotatably mounted on said table for endwise movement therewith, a nut in threaded engagement with said screw and supported on said base for rotary adjustment, an elongated sine bar pivotally mounted intermediate its ends on said table and having a contact face extending generally longitudinally thereof, two transverse pins extending slidably in said table for engagement with opposite end portions of said bar, an adjusting bar slidably mounted in said table and having oppositely inclined wedge faces respectively engaging said pins, gear means for longitudinally adjusting said adjusting bar to adjust said sine bar into different selective angular positions, and a follower on said nut and slidably engaging said contact face.

11. In a machine tool, in combination, a support, a member reciprocable on said support, a rotatably adjustable nut element and a rotatable screw element in threaded engagement, one of said elements being mounted on said support and the other of said elements being mounted on said member, means for rotating said screw element to translate said member, an elongated angularly adjustable sine bar having a longitudinal contact face extending generally in the direction of said screw and mounted for relative movement with said nut element, means for angularly adjusting said sine bar, a follower on said nut element and coacting with said contact face to determine the rotary position of said nut element in relation to the position of translation of said member, and means for holding said follower operatively against said contact face.

12. In a machine tool, in combination, a support, a member reciprocable on said support, a rotatably adjustable nut element and a rotatable screw element in threaded engagement, one of said elements being mounted on said support and the other of said elements being mounted on said member, means for rotating said screw element to translate said member, an elongated sine bar having a longitudinal contact face extending generally in the direction of said screw element and mounted for relative movement with said nut element, said sine bar being selectively adjustable into parallelism with said screw or into oppositely inclined positions relative thereto, and a follower on said nut element and coacting with said contact face to determine the rotary position of said nut element in relation to the position of translation of said member.

13. In a machine tool, in combination, a support, a member translatable on said support, a normally stationary nut mounted on said support, a lead screw in threaded engagement with said nut and mounted on said member for translation therewith, drive means mounted on and movable with said member and having an axial slidable spline connection with one end of said screw for rotating said screw to translate said member, a cylinder mounted on said member axially of said screw, said screw having a shaft portion on the other end extending slidably and rotatably into said cylinder, a piston slidable in said cylinder and rotatably fixed on said shaft portion for axial movement therewith, adjustable stop means for determining the permissible range of movement of said piston in said cylinder, means for adjusting said cylinder axially on said member to vary the position of said member relative to said screw, and means for supplying fluid under pressure selectively to opposite ends of said cylinder to compensate for back-lash between said nut and said screw.

14. In a machine tool, in combination, a support, a member translatable on said support, a normally stationary nut mounted on said support, a lead screw in threaded engagement with said nut and mounted on said member for translation therewith, drive means for rotating said screw to translate said member, a cylinder mounted on said member axially of said screw and for axial adjustment, said screw having a shaft portion extending slidably and rotatably into said cylinder, a piston slidable in said cylinder and fixed on said shaft portion for axial movement therewith, means for supplying fluid under pressure selectively to opposite ends of said cylinder to compensate for back-lash between said nut and said screw, a longitudinal gear rack on said cylinder, two pinions on parallel axes meshing with said rack, two pivotal gear segments meshing respectively with the adjacent sides of said pinions, two parallel adjusting screws threaded in said support for engagement respectively with said segments, and gear means for reversibly turning said screws respectively in opposite directions to adjust said segments oppositely and being selectively available to turn only one of said screws to clamp said segments in position of adjustment.

15. In a machine tool, in combination, a support, a member translatable on said support, a normally stationary nut mounted on said support, a lead screw in threaded engagement with said nut and mounted on said member for translation therewith, reversible drive means mounted on said member for rotating said screw to translate said member, a cylinder mounted on said member axially of said screw, said screw having a shaft portion extending slidably and rotatably into said cylinder, a piston slidable in said cylinder and fixed on said shaft portion for axial movement therewith, means for adjustably limiting the extent of movement of said piston in said cylinder, means for adjusting said cylinder axially on said member to vary the position of said member relative to said screw, and for locking said cylinder in position of adjustment, means operable by said member for automatically reversing the operation of said drive means, and means for supplying fluid under pressure selectively to opposite ends of said cylinder, and being automatically reversible upon reversal of said drive means.

16. In a machine tool, in combination, a support, a member translatable on said support, a nut element and a screw element in threaded engagement, one of said elements bing mounted on said support and the other of said elements being mounted on said member for movement therewith, means for rotating one of said elements relatively to the other to translate said member, a cylinder mounted for axial adjustment on said member, a piston reciprocable in said cylinder and connected to the element mounted on said member, means for supplying fluid under pressure to said cylinder to compensate for back-lash between said elements, oppositely acting means for adjusting said cylinder respectively in opposite directions on said member, and means for simultaneously actuating said last mentioned means in opposite directions to adjust said cylinder, and being selectively available to actuate only one of said last mentioned means to lock said cylinder in position of adjustment.

17. In a machine tool, in combination, a support, a member slidable on said support, a normally stationary nut mounted on and movable with said member, a screw rotatably anchored against endwise movement on said support and in threaded engagement with said nut, means for rotating said screw, a cylinder fixed on said member, a piston slidable in said cylinder and in axial threaded engagement with said screw for movement simultaneously with said nut along said screw upon rotation of said screw, said piston being constrained against rotation with said screw, and means for supplying fluid under pressure selectively to either end of said cylinder to take up back-lash between said nut and said screw.

18. In a machine tool, in combination, a support, a member slidable on said support, a nut element and a screw element in threaded engagement, one of said elements being mounted on said support and the other of said elements being mounted on said member, means for rotating said screw element to translate said member, means for rotating said nut element to translate said member, a cylinder on said member, a piston slidable in said cylinder and in axial threaded engagement with the element on said support for movement with said member along said one element upon rotation of the latter, and means for supplying fluid under pressure selectively to either end of said cylinder to take up back-lash between said nut element and said screw element.

19. In a machine tool, in combination, a base, a table reciprocable on said base, a hydraulic unit on said table and having inlet and outlet pressure fluid connections, a manifold block fixed on said table and formed with three parallel longitudinal bores extending in the direction of table movement, a manifold plate mounted on said base and formed with three fluid passages, three parallel tubes fixed to said plate in communication respectively with said passages and extending respectively into said bores and having ports opening to said bores, hydraulic seals in opposite ends of said bores about said tubes, bushings fixed in opposite ends of said bores inwardly of said seals to define with said seals leakage collecting spaces and slidably engaging said tubes, two of said bores being open to said connections, and passages in said block connecting said spaces to the third bore.

20. In a machine tool, in combination, a base, a table reciprocable on said base, a hydraulic unit on said table, a manifold block fixed on said table and formed with a longitudinal bore extending in the direction of table movement and connected to said unit, a manifold plate mounted on said base and formed with a fluid passage, a tube fixed to said plate in communication with said passage and extending slidably into said bore and having ports opening to said bore, and hydraulic seals in opposite ends of said bore about said tube.

21. In a machine tool, in combination, a base, a table reciprocable on said base, a hydraulic unit on said table, a manifold block fixed on said table, a manifold block mounted on said base and formed with a fluid passage, one of said blocks being formed with a bore extending in the direction of table movement, a tube mounted on the other of said blocks and extending slidably into and opening to said bore and hydraulic seal means between said bore and said tube to resist the scope of fluid from said bore along said tube, said bore and said tube constituting a connection between said passage and said unit.

22. In a machine tool, in combination, a base, a table reciprocable on said base, a hydraulic unit on said table, a manifold block fixed on said table and formed with a longitudinal bore connected to said unit and extending in the direction of table movement, a manifold plate mounted on said base and formed with a fluid passage and with a bore connected to said passage and in axial alignment with said first mentioned bore, a tubular nut extending through said last mentioned bore and having ports open to said passage, a tube threaded onto said nut against said plate and extending slidably into said first mentioned bore and having ports opening to said first mentioned bore, hydraulic seals in opposite ends of said bore about said tube, bushings fixed in opposite ends of said bore about said tube and inwardly of said seals to define therewith leakage collecting spaces, and passages in said first mentioned block for draining said spaces.

23. In a machine tool, in combination, a base, a table reciprocable on said base, a headstock pivotally adjustable on said table and having a rotary spindle, a hydraulic motor mounted in said headstock for driving said spindle, means operable by said motor for translating said table, a hydraulic motor on said table for compensating for back-lash in said last mentioned means, a manifold block fixed on said table, a manifold block mounted on said base and formed with a fluid passage, and fluid inlet and outlet connections for said motors, each of said connections for one of said motors comprising a bore formed in said blocks and extending in the direction of table movement, a tube mounted on the other of said blocks in communication with said passage and extending slidably into said bore and open to said bore, and hydraulic seal means between said bore and said tube to resist the escape of fluid from said bore along said tube.

24. In a machine tool, in combination, a base, a table reciprocable on said base, a cross slide mounted on said base for movement transversely of said table, a nut and screw drive for translating said slide, and a feeding mechanism for said drive comprising a drive shaft, a ratchet wheel keyed to said shaft, a lever mounted for oscillation about said shaft and carrying a gravity pawl for engagement with said ratchet, a shield adjustably secured to said wheel for rotation therewith and disposed in the path of said pawl, a hand wheel on said shaft, releasable means for securing said shaft against rotation, a cylinder on said base, a piston in said cylinder, an over-center adjustable-stroke toggle mechanism operatively connecting said piston to said pawl lever, and means for supplying fluid under pressure alternately to opposite ends of said cylinder.

25. In a machine tool, in combination, a base, a slide mounted on said base, a nut and screw drive for translating said slide, and a feeding mechanism for said drive comprising a drive shaft geared to said drive, a ratchet wheel fixed to said shaft, a lever mounted for oscillation about said shaft and carrying a pawl for engagement with said ratchet, a shield adjustably secured to said wheel for rotation therewith and disposed in the path of said pawl, a cylinder on said base, a piston in said cylinder, an over-center adjustable-stroke toggle mechanism connecting said piston to said lever for oscillating said lever back and forth once for each stroke of said piston in each direction, and means for supplying fluid under pressure alternately to opposite ends of said cylinder.

26. In a machine tool, in combination, a base, a member slidable on said base and having a longitudinal bore opening to one end, a gage rod extending slidably into said bore and being slidably guided in said base, means for adjusting said rod longitudinally in said base, releasable clutch means for connecting said rod in position of relative adjustment to said member and including actuating means extending axially through said rod, a gage mounted on said base, and means operatively connecting said rod to said gage to indicate the extent of movement of said member.

27. In a machine tool, in combination, a base, a member slidable on said base and having a longitudinal bore opening to one end, means for translating said member, a gage rod slidably guided in said base and having an expansible end extending slidably into said bore, releasable means extending axially through said rod for expanding said end into engagement with the surface of said bore, a gage mounted on said base, and means on said rod and coacting with said gage to indicate the extent of translation of said member.

28. In a machine tool, in combination, a base, a member horizontally slidable on said base and formed with an upstanding side bracket having spaced transverse upwardly arcuate guide elements, a cradle having arcuate guide elements mounted for angular adjustment on said first mentioned elements, gear segments formed on said cradle, an adjusting shaft journalled in said bracket, pinions fixed on said shaft and meshing with said segments, means for clamping said cradle in position of adjustment, and a spindle structure mounted on said cradle and having a rotary spindle, the axis of said spindle extending transversely of and substantially intersecting the axis of said cradle.

29. In a machine tool, in combination, a base, a member slidable on said base, a cradle mounted for angular adjustment on said member, means for angularly adjusting said cradle, means for clamping said cradle in position of adjustment, a spindle bracket mounted on said cradle, a sleeve journalled in said bracket, a spindle journalled eccentrically in said sleeve and extending transversely of said member, and means for oscillating said sleeve.

30. In a machine tool, in combination, a base, a member slidable on said base, a cradle mounted for angular adjustment on said member, means for angularly adjusting said cradle, means for clamping said cradle in position of adjustment, a spindle bracket mounted on said cradle, a sleeve journalled in said bracket, a spindle journalled eccentrically in said sleeve and extending transversely of said member, an arcuate double-sided gear rack guided in said cradle, a shaft journalled in said cradle and geared to one side of said rack, a crank connection between said shaft and said sleeve, a drive shaft journalled in said member and geared to the other side of said rack, and means for oscillating said last mentioned shaft to oscillate said sleeve and thereby impart a lateral relieving reciprocation to said spindle.

31. In a machine tool, in combination, a base, a member slidable on said base, a cradle mounted for angular adjustment on said member, means for angularly adjusting said cradle, means for clamping said cradle in position of adjustment, a spindle bracket mounted on said cradle, a sleeve journalled in said bracket, a spindle journalled eccentrically in said sleeve and extending transversely of said member, releasable means for locking said sleeve against rotation, an arcuate double-sided gear rack guided in said cradle, a shaft journalled in said cradle and geared to one side of said rack, a releasable crank connection between said shaft and said sleeve, a drive shaft journalled in said member and geared to the other side of said rack, and means for oscillating said last mentioned shaft to oscillate said sleeve and thereby impart a lateral relieving reciprocation to said spindle.

32. In a machine tool, a spindle structure comprising, in combination, a housing formed with a bore and mounted for angular adjustment about a horizontal axis extending transversely of said bore to locate said bore selectively in a horizontal position or with either end of said bore at a higher elevation than the other end, a spindle having an intermediate cylindrical portion extending in close concentrically spaced relation through said bore, anti-friction bearings in opposite ends of said housing and disposed closely adjacent the ends of said cylindrical portion for rotatably supporting said spindle, lubricant seals about said spindle externally of said bearings, lubricant supply means having an outlet port opening to the top side of said bore intermediate said bearings, two peripheral helical grooves of opposite lead formed in opposite end portions of said cylindrical portion, with the innermost ends of said grooves out of direct communication and extending through the transverse plane of said port and the outermost ends of said grooves extending to the ends of said cylindrical portion and opening respectively to said bearings, and means for rotating said spindle in a direction in relation to the lead of said grooves to cause said grooves to effect the passage of lubricant from said port outwardly toward said bearings.

33. In a machine tool, a spindle structure comprising, in combination, a housing angularly adjustable about a horizontal axis and formed with a bore extending transversely of said axis, a spindle extending in close concentrically spaced relation through said bore, bearings in opposite ends of said bore for supporting said spindle, lubricant supply means having an outlet port opening to an intermediate portion of said bore, two peripheral helical grooves of opposite lead formed in opposite end portions of said spindle, with the innermost ends of said grooves overlapping and extending through the transverse plane of said port and with the outermost ends of said grooves terminating in close proximity to said bearings, and means for rotating said spindle in a direction to cause lubricant to move from said port outwardly through the peripheral clearance space between said bore and said spindle and along said grooves toward both said bearings regardless of the position of adjustment of said housing.

34. A machine for relief grinding fluted work pieces comprising, in combination, a base, a table reciprocable on said base, a nut and screw drive for said table, a headstock having a work spindle and mounted on said table for angular adjustment to position said spindle relative to the direction of table movement for straight and taper grinding, a motor on said headstock for driving said spindle, change gear means for operating said nut and screw drive from and in timed relation to said spindle, a slide mounted on said base for feed movement transversely of said table, a grinding spindle fixture mounted on said slide of angular adjustment about an axis extending transversely of said table and including a grinding wheel spindle mounted therein for a lateral relieving reciprocation toward and from said work spindle, a rock shaft journaled on the base and operatively connected to reciprocate said grinding wheel spindle in any position of said slide and said fixture, a back-off cam rotatable by said work spindle, and adjustable means operable by said cam to oscillate said rock shaft in timed relation to the rotation of said work spindle and translation of said table.

35. In a grinding machine, a base, a table reciprocable on said base, a nut element and a screw element in rotary threaded engagement and extending longitudinally of said table within said base, one of said elements being mounted for rotary adjustment in fixed position on said base and the other of said elements being rotatably and adjustably anchored to said table, a headstock mounted for pivotal adjustment on said table, a work spindle mounted in said headstock and extending generally longitudinally of said table, a reversible hydraulic motor mounted on said headstock and operatively connected to drive said spindle and to drive said other element in any position of adjustment of said headstock and in timed relation in accordance with a predetermined lead, a source of fluid under pressure mounted on said base, and means for connecting said source reversibly to said motor, said last mentioned means including parts respectively on said base and said table and in sealed sliding engagement to define adjustable passage connections to said motor in all positions of table reciprocation.

36. In a grinding machine, a base, a table reciprocable on said base, a nut element and a screw element in rotary threaded engagement and extending longitudinally of said table within said base, one of said elements being mounted for rotary adjustment in fixed position on said base and the other of said elements being rotatably and adjustably anchored to said table, a head stock mounted for pivotal adjustment on said table, a work spindle mounted in said headstock and extending generally longitudinally of said table, a reversible hydraulic motor mounted on said head stock and operatively connected to drive said spindle and to drive said other element in any position of adjustment of said headstock and in timed relation in accordance with a predetermined lead, and means for automatically rotating said one element in timed relation to the translation of said table to superimpose a movement on said table to provide a compensated lead.

37. In a grinding machine, a base, a table reciprocable on said base, a nut element and a screw element in rotary threaded engagement and extending longitudinally of said table within said base, one of said elements being mounted for rotary adjustment in fixed position on said base and the other of said elements being rotatably and adjustably anchored to said table, a headstock mounted for pivotal adjustment on said table, a work spindle mounted in said headstock and extending generally longitudinally of said table, a reversible hydraulic motor mounted on said head stock and operatively connected to drive said spindle and to drive said other element in any position of adjustment of said headstock and in timed relation in accordance with a predetermined lead, the connection between said other element and said table including a reversible hydraulic backlash compensator, a source of fluid underpressure in said base, and means for directing fluid from said source reversely to said compensator, said last mentioned means including tubular slip connections having parts mounted respectively on said base and said table to provide flow connections to said compensator in all positions of table reciprocation.

38. A thread grinding machine comprising, in combination, a base, a table translatable on said base, a headstock mounted on said table for translation therewith and for angular adjustment relative to the direction of translation, a work spindle journaled in said headstock to support work either for straight or tapered grinding depending on the angular position of said headstock, a cross feed slide mounted on said base for movement transversely of said table, a grinding wheel spindle mounted on said slide for angular adjustment in accordance with different thread leads on the work, means for rotating said work spindle in any angular position of adjustment of said headstock and for translating said table in positive timed relation, said means including speed change gears for determining said relation, and means selectively available to adjust said last mentioned means in timed relation to the translation of said table so as to modify said relation to compensate the lead when said headstock is adjusted angularly out of parallel relation to said table for taper grinding or to adjust said relation to compensate for different work leads.

39. A thread grinding machine comprising, in combination, a base, a table reciprocable on said base, a headstock mounted on said table for movement therewith and for angular adjustment relative to the direction of movement, a work spindle mounted in said headstock, a rock shaft mounted on said base and extending longitudinally thereof, means on said headstock operable from said spindle and operatively connected to said rock shaft to oscillate the latter in timed relation to the rotation of said spindle in any angular position of adjustment of said headstock and in any position of reciprocation of said table, a cross feed slide mounted on said base for movement transversely of said table, a grinding wheel spindle mounted on said slide for back-off reciprocation toward and from said work spindle, means on said slide for imparting such back-off reciprocation to said grinding wheel spindle, and a drive shaft extending longitudinally of said slide and splined to said last mentioned means to drive the latter in any position of adjustment of said slide, said drive shaft being geared to said rock shaft.

40. In a machine tool, in combination, a support, a member slidable on said support, a cylinder body mounted in fixed position on the underside of said member and formed with a bore opening therethrough, a normally stationary nut mounted in one end of said bore for movement with said member, a screw anchored against endwise movement and extending through said bore into threaded engagement with said nut to effect translation of said member upon rotation of said screw, the other end of said bore being enlarged to constitute a cylinder and having an outer end wall with an opening in alignment with said bore, a piston reciprocable in said cylinder and having reduced ends guided in said bore and said opening, means for preventing rotation of said piston with said screw, said piston being in axial threaded engagement with said screw for movement simultaneously with said nut along said screw upon rotation of said screw, and means for supplying fluid under pressure selectively to either end of said cylinder to take up blacklash between said nut and said screw.

41. In a machine tool, in combination, a base, a table reciprocable on said base, a work spindle rotatably mounted on said table, a cross feed slide mounted on said base for adjustment transversely of said table, a swivel member mounted on said slide for angular adjustment about an axis extending transversely of said table, means on said swivel member for supporting a tool spindle in a plane parallel to the direction of reciprocation of said table and perpendicular to the direction of feed of said slide, said means being operable to move said tool spindle on said slide in a relieving reciprocation toward and from said table, and means operable in positive timed relation to said work spindle and operatively connected to said first mentioned means to drive the latter so as to effect said relieving reciprocation in any angular position of adjustment of said swivel member on said slide and any position of adjustment of said cross feed slide.

42. In a machine tool, a spindle structure comprising, in combination, a spindle bracket having a longitudinal bore opening therethrough, a generally tubular spindle housing extending in peripherally spaced relation through said bore and supported therein at opposite ends by antifriction bearings, said housing being formed with a bore opening longitudinally therethrough and located eccentrically to the axis of rotation of said housing, a tool spindle extending coaxially through said last mentioned bore and supported therein at opposite ends by antifriction bearings, a grinding wheel mounted on one end of said spindle externally of said housing, drive means on the other end of said spindle externally of said housing, means for supporting said bracket for adjustment about an axis perpendicular to the spindle axis and lying in the plane of said grinding wheel, and means for oscillating said housing in said bracket to cause a back and forth movement of said grinding wheel in the general direction of said last mentioned axis in any position of adjustment of said bracket about said last mentioned axis.

IRA J. SNADER.